(12) United States Patent
Takashima et al.

(10) Patent No.: US 8,315,033 B2
(45) Date of Patent: Nov. 20, 2012

(54) MULTILAYER CAPACITOR HAVING LOW ESL AND EASILY CONTROLLABLE ESR

(75) Inventors: Hirokazu Takashima, Sabae (JP);
Hiroshi Ueoka, Higashiomi (JP);
Yoshikazu Takagi, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 203 days.

(21) Appl. No.: 12/623,574

(22) Filed: Nov. 23, 2009

(65) Prior Publication Data
US 2010/0128413 A1    May 27, 2010

(30) Foreign Application Priority Data

Nov. 26, 2008  (JP) ................................. 2008-300689

(51) Int. Cl.
*H01G 4/005* (2006.01)
*H01G 4/228* (2006.01)
(52) U.S. Cl. ..................................... 361/303; 361/306.3
(58) Field of Classification Search .................. 361/303, 361/306.3, 321.2
See application file for complete search history.

(56) References Cited

U.S. PATENT DOCUMENTS

| | | | | |
|---|---|---|---|---|
| 6,816,356 B2* | 11/2004 | Devoe et al. | ................... | 361/309 |
| 7,145,429 B1* | 12/2006 | Togashi et al. | ................. | 336/200 |
| 7,595,973 B1* | 9/2009 | Lee et al. | .................... | 361/306.3 |
| 7,663,862 B2* | 2/2010 | Togashi | ...................... | 361/306.3 |
| 7,667,950 B2* | 2/2010 | Togashi | ...................... | 361/306.3 |
| 7,688,568 B1* | 3/2010 | Lee et al. | .................... | 361/306.3 |
| 8,081,416 B2* | 12/2011 | Lee et al. | ...................... | 361/303 |
| 2004/0042155 A1 | 3/2004 | Ritter et al. | | |
| 2007/0268651 A1 | 11/2007 | Takashima et al. | | |
| 2008/0144253 A1* | 6/2008 | Togashi | ...................... | 361/301.4 |
| 2008/0153294 A1 | 6/2008 | Kang et al. | | |
| 2009/0015986 A1* | 1/2009 | Togashi | ...................... | 361/321.4 |
| 2009/0086406 A1* | 4/2009 | Lee et al. | .................... | 361/306.3 |
| 2009/0213525 A1* | 8/2009 | Lee et al. | ...................... | 361/303 |

FOREIGN PATENT DOCUMENTS

EP    1 783 790 A1    5/2007

(Continued)

OTHER PUBLICATIONS

Official Communication issued in corresponding Japanese Patent Application No. 2008-300689, mailed on May 31, 2011.

*Primary Examiner* — David M Sinclair
(74) *Attorney, Agent, or Firm* — Keating & Bennett, LLP

(57) ABSTRACT

In a capacitor body, a single second capacitor unit is interposed between two first capacitor units. The width direction dimension of each of extended portions of first and second internal electrodes included in the first capacitor unit is larger than the width direction dimension of each of extended portions of third and fourth internal electrodes included in the second capacitor unit. The area of each of the respective portions of a first opposed portion of the first internal electrode and a second opposed portion of the second internal electrode, the respective portions being opposed to each other, is smaller than the area of each of respective portions of opposed portions of the third and fourth internal electrodes, the respective portions being opposed to each other. Thus, a multilayer capacitor has a characteristic that is a combination of a low-ESL characteristic of the first capacitor unit and a high-ESR characteristic of the second capacitor.

9 Claims, 18 Drawing Sheets

FOREIGN PATENT DOCUMENTS

| | | |
|---|---|---|
| EP | 1 953 776 A1 | 8/2008 |
| EP | 1 953 777 A1 | 8/2008 |
| JP | 59-63429 A | 4/1984 |
| JP | 9-148174 A | 6/1997 |
| JP | 2001-044074 A | 2/2001 |
| JP | 2001-185449 A | 7/2001 |
| JP | 2004-47983 A | 2/2004 |
| JP | 2006-203168 A | 8/2006 |
| JP | 2007-142295 A | 6/2007 |
| JP | 2007-142296 A | 6/2007 |
| JP | 2007-173838 A | 7/2007 |
| JP | 2007-311567 A | 11/2007 |
| JP | 2008-004923 A | 1/2008 |
| JP | 2008-153294 A | 7/2008 |
| WO | 2006/022258 A1 | 3/2006 |

* cited by examiner

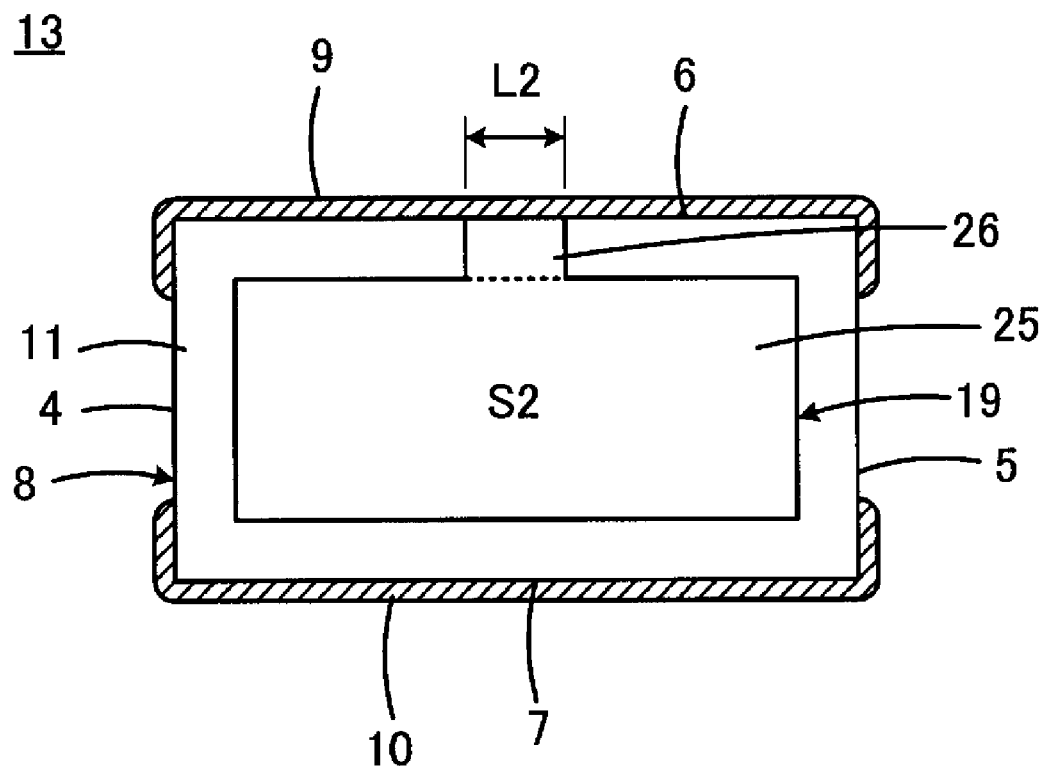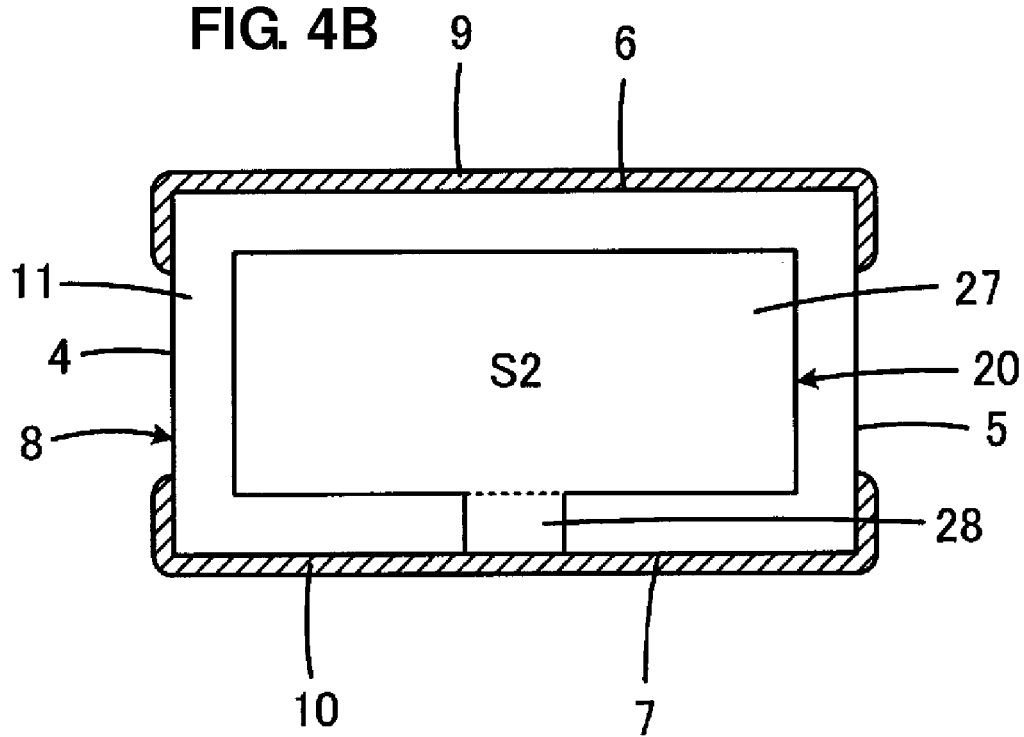

MULTILAYER CAPACITOR HAVING LOW ESL AND EASILY CONTROLLABLE ESR

BACKGROUND OF THE INVENTION

1. Field of the Invention

The present invention relates to a multilayer capacitor, in particular, to an improvement for easily controlling of the equivalent series resistance (ESR) of a multilayer capacitor.

2. Description of the Related Art

A large variation in voltage of a power supply line in a power supply circuit due to the impedance of the power supply line or the ground destabilizes the operation of a driven circuit, causes interference between circuits coupled via the power supply circuit, or causes oscillation. For this reason, typically, a decoupling capacitor is coupled between the power supply line and the ground. The decoupling capacitor reduces the impedance between the power supply line and the ground and restrains variations in power supply voltage or interference between the circuits.

Incidentally, in recent years, signals have been speeded up in communication apparatuses such as cell phones and information processing apparatuses such as personal computers in order to process a great amount of information. Also, the clock frequency of an IC used in such an apparatus has been increased. Therefore, noise containing many harmonic components tends to occur. For this reason, an IC power supply circuit must be decoupled more strongly.

In order to increase a decoupling effect, it is effective to use a decoupling capacitor having a good impedance frequency characteristic. Among such decoupling capacitors is a multilayer ceramic capacitor. A multilayer ceramic capacitor has a small ESL (equivalent series inductance), so it has a better noise absorption effect over a wide frequency band than an electrolytic capacitor.

Another role of the decoupling capacitor is to provide electrical charge to an IC. Typically, the decoupling capacitor is disposed near the IC. When the voltage of the power supply line varies, the decoupling capacitor provides electrical charge to the IC, thereby preventing a delay in start of the IC.

When the capacitor is charged or discharged, the counter electromotive force dV represented by a formula $dV=L \cdot di/dt$ occurs in the capacitor. A large dV delays the supply of electrical charge to the IC. As the clock frequency of ICs is increased, the current variation amount di/dt per unit time tends to increase. That is, in order to reduce dV, the inductance L must be reduced. For this reason, it is desirable to further reduce the ESL of the capacitor.

As a low-ESL-type multilayer ceramic capacitor where the ESL has been further reduced, for example, an LW reverse-type multilayer ceramic capacitor is known. For a typical multilayer ceramic capacitor, the length direction dimension (W dimension) of an end surface of a capacitor body including an external terminal electrode is smaller than the length direction dimension (L dimension) of a side surface adjacent to the above-mentioned end surface of the capacitor body. On the other hand, for an LW reverse-type multilayer ceramic capacitor, the length direction dimension (W dimension) of an end surface having an external terminal electrode formed thereon is larger than the length direction dimension (L dimension) of a side surface. In such an LW reverse-type multilayer ceramic capacitor, the capacitor body has a wide, short current path. Therefore, the LW reverse-type multilayer ceramic capacitor has a lower ESL.

However, since the current path is wide and short in the low-ESL-type multilayer ceramic capacitor as described above, the ESR is reduced accordingly.

Also, multilayer ceramic capacitors are required to have a larger capacitance. In order to increase the capacitance of a multilayer ceramic capacitor, it is conceivable to increase the numbers of ceramic layers and internal electrodes. In this case, the ESR is reduced as well, since the number of current paths is increased. That is, due to requests for a lower ESL and a larger capacitance, the ESR of multilayer ceramic capacitors tends to decrease further.

However, it is known that when the ESR of a capacitor becomes too low, impedance mismatching between circuits occurs and thus damped vibration, called "ringing," where the rising edge of a signal waveform is distorted, tends to occurs. When ringing occurs, the IC may malfunction due to a disturbed signal.

Also, when the ESR of the capacitance becomes too low, the impedance frequency characteristic of the capacitor becomes too steep near the resonance frequency. Thus, the anti-resonance point that occurs between the resonance frequency of the capacitor and that of another capacitance mounted nearby may be increased so that a noise absorption effect in a frequency band near the anti-resonance point is reduced.

In order to prevent a phenomenon unfavorable for design of a circuit as described above, it is effective to connect a resistance element to a line in series and thus intentionally dampen the waveform showing the impedance frequency characteristic. In recent years, it has been proposed that a capacitor itself have resistance components and attention has been paid to means for controlling the ESR of the capacitor.

For example, Japanese Unexamined Patent Application Publication No. 2004-47983 and International Application 2006/022258 propose that an external terminal electrode electrically coupled to an internal electrode contain resistance components so that the ESR is controlled. In particular, International Disclosure 2006/022258 pamphlet describes a multilayer ceramic capacitor including a resistance component-contained external terminal electrode formed by baking, to a capacitor body, a resistance paste containing a resistance material, such as ITO, by immersing the capacitor body in the resistance paste.

Among conceivable methods for controlling the ESR of the capacitor in a case where the external terminal electrode has resistance components as in Japanese Unexamined Patent Application Publication No. 2004-47983 and International Application 2006/022258 are adjustment of the resistivity of the resistance material and adjustment of the application thickness of the resistance paste.

However, it is troublesome to prepare several types of resistance pastes in order to adjust the resistivity of the resistance material. Also, when changing the composition of the resistance paste in order to adjust the resistivity, other factors such as the reactivity to the internal electrode and the adhesion to the capacitor body may be affected.

Also, adjustment of the application thickness of the resistance paste requires adjustment of the viscosity of the resistance paste. In this case, other factors may be affected as well, since the composition of the resistance paste is changed. Also, there is a technical limit to thick application of a resistance paste, so there is a problem that performance of control, in particular, with a view toward increasing the ESR, prevented.

SUMMARY OF THE INVENTION

Accordingly, preferred embodiments of the present invention inexpensively and easily provide a multilayer capacitor that has a low ESL and is allowed to easily perform ESR control.

A multilayer capacitor according to a first preferred embodiment of the present invention includes a capacitor body having a structure including a plurality of laminated dielectric layers, the capacitor body preferably having a substantially rectangular parallelepiped shape and including first and second main surfaces extending along a surface direction of the dielectric layers and opposed to each other, first and second side surfaces opposed to each other, and first and second end surfaces opposed to each other, a length direction dimension of each of the first and second end surfaces being larger than a length direction dimension of each of the first and second side surfaces. The multilayer capacitor also includes first and second external terminal electrodes disposed on the first and second end surfaces, respectively, of the capacitor body.

The capacitor body includes first and second capacitor units disposed along a lamination direction of the dielectric layers. The first capacitor unit includes first and second internal electrodes, the first and second internal electrodes being opposed to each other with a predetermined dielectric layer of the dielectric layers interposed therebetween so as to generate a capacitance. The second capacitor unit includes third and fourth internal electrodes, the third and fourth internal electrodes being opposed to each other with a predetermined dielectric layer of the dielectric layers interposed therebetween so as to generate a capacitance.

The first internal electrode includes a first opposed portion and a first extended portion that is extended from the first opposed portion to the first end surface and that is electrically coupled to the first external terminal electrode. The second internal electrode includes a second opposed portion opposed to the first opposed portion with the predetermined dielectric layer interposed therebetween and a second extended portion that is extended from the second opposed portion to the second end surface and that is electrically coupled to the second external terminal electrode.

The third internal electrode includes a third opposed portion and a third extended portion that is extended from the third opposed portion to the first end surface and that is electrically coupled to the first external terminal electrode. The fourth internal electrode includes a fourth opposed portion opposed to the third opposed portion with the predetermined dielectric layer interposed therebetween and a fourth extended portion that is extended from the fourth opposed portion to the second end surface and that is electrically coupled to the second external terminal electrode.

A width direction dimension of the first extended portion is larger than a width direction dimension of the third extended portion. An area of each of respective portions of the first and second opposed portions, the respective portions being opposed to each other, is smaller than an area of each of respective portions of the third and fourth opposed portions, the respective portions being opposed to each other.

In the multilayer capacitor according to the first preferred embodiment, a width direction dimension of the second extended portion may be larger than a width direction dimension of the fourth extended portion.

In the second capacitor unit, the plurality of third internal electrodes may be disposed continuously in a lamination direction. Also, the plurality of fourth internal electrodes may be disposed continuously in the lamination direction.

In the multilayer capacitor according to the first preferred embodiment, the multilayer capacitor is preferably mounted in such a manner that the first capacitor unit is closer to a mount surface than the second capacitor unit.

A multilayer capacitor according to a second preferred embodiment of the present invention includes a capacitor body having a structure including a plurality of laminated dielectric layers, the capacitor body preferably having a substantially rectangular parallelepiped shape and including first and second main surfaces opposed to each other, first and second side surfaces extending along a surface direction of the dielectric layers and opposed to each other, and first and second end surfaces opposed to each other. The multilayer capacitor also includes first and second external terminal electrodes that are disposed on at least the second main surface in a state where the first and second external terminal electrodes are insulated from each other. The multilayer capacitor is mounted in such a manner that the second main surface faces a mount surface.

The capacitor body includes first and second capacitor units disposed along a lamination direction of the dielectric layers. The first capacitor unit includes first and second internal electrodes, the first and second internal electrodes being opposed to each other with a predetermined dielectric layer of the dielectric layers interposed therebetween so as to generate a capacitance. The second capacitor unit includes third and fourth internal electrodes, the third and fourth internal electrodes being opposed to each other with a predetermined dielectric layer of the dielectric layers interposed therebetween so as to generate a capacitance.

The first internal electrode includes a first opposed portion and a first extended portion that is extended from the first opposed portion to the second main surface and that is electrically coupled to the first external terminal electrode. The second internal electrode includes a second opposed portion opposed to the first opposed portion with the predetermined dielectric layer interposed therebetween and a second extended portion that is extended from the second opposed portion to the second main surface and that is electrically coupled to the second external terminal electrode.

The third internal electrode includes a third opposed portion and a third extended portion that is extended from the third opposed portion and that is electrically coupled to the first external terminal electrode. The fourth internal electrode includes a fourth opposed portion opposed to the third opposed portion with the predetermined dielectric layer interposed therebetween and a fourth extended portion that is extended from the fourth opposed portion and that is electrically coupled to the second external terminal electrode.

A width direction dimension of the first extended portion is larger than a width direction dimension of the third extended portion. An area of each of respective portions of the first and second opposed portions, the respective portions being opposed to each other, is smaller than an area of each of respective portions of the third and fourth opposed portions, the respective portions being opposed to each other.

In the multilayer capacitor according to the second preferred embodiment, a width direction dimension of the second extended portion may be larger than a width direction dimension of the fourth extended portion.

In the multilayer capacitor according to the second preferred embodiment, the plurality of third internal electrodes may be disposed continuously in a lamination direction in the second capacitor unit. Also, the plurality of fourth internal electrodes may be disposed continuously in the lamination direction in the second capacitor unit.

According to the various preferred embodiments of the present invention, the width direction dimension of the first extended portion of the first capacitor unit is preferably larger than that of the third extended portion. Thus, the first extended portion has a wider current path and thus the first capacitor unit has a lower per-layer ESL. Also, the area of each of the respective portions of the first and second opposed portions that are opposed to each other is smaller than the area of each of the respective portions of the third and fourth opposed portions that are opposed to each other. Therefore, the first capacitor unit has a lower per-layer capacitance and thus has a relatively high resonance frequency.

On the other hand, the width direction dimension of the third extended portion of the second capacitor unit is preferably shorter. Therefore, the second capacitor unit has a narrower current path and thus has a higher per-layer ESR. Also, for the second capacitor, the area of each of the respective portions of the third and fourth opposed portions that are opposed to each other is larger. Therefore, the second capacitor unit has a higher per-layer capacitance and thus has a relatively low resonance frequency.

Thus, the multilayer capacitors according to the preferred embodiments of the present invention each have a characteristic that is a combination of a low-ESL characteristic of the first capacitor unit and a high-ESR characteristic of the second capacitor unit. By adopting the preferred embodiments of the present invention, multilayer capacitors having a low ESL and a high ESR are obtained. Also, by changing the ratio between the contact areas between the internal electrodes and external terminal electrodes of the first capacitor unit and those of the second capacitor unit or the ratio between the number of the laminated layers of the internal electrodes of the first capacitor unit and that of the second capacitor unit, the position of the resonance point or the ESR is easily controlled.

Also, if the number of the laminated layers of the first capacitor unit is equal to that of the second capacitor unit, the first capacitor unit has a lower capacitance. This makes it easy to separate the positions of the resonance points of the two capacitor units from each other. This makes it easy to obtain broad frequency characteristics.

On the other hand, if the total capacitance of the first capacitor unit and that of the second capacitor unit are equalized by increasing the number of the laminated layers of the first capacitor unit, the ESL of the first capacitor unit is significantly reduced. This also makes it easy to separate the points of the resonance points of the two capacitor units from each other, thereby making it easy to obtain broad frequency characteristics.

As seen, the multilayer capacitors according to the preferred embodiments of the present invention each have a very high degree of flexibility in designing frequency characteristics.

By adopting the preferred embodiments of the present invention, the width direction dimension of the second extended portion is made larger than that of the fourth extended portion. Thus, the extended portions are disposed in balance inside the capacitor body. This stabilizes the lamination state of the capacitor body, as well as enhances an effect of a reduction in ESR of the first capacitor unit and an effect of an increase in ESR of the second capacitor unit.

Incidentally, if the internal electrodes of the second capacitor unit each have a relatively short width direction dimension, the contact areas between the extended portions and the external terminal electrodes electrically coupled thereto are typically relatively small. In this case, the internal electrodes and external terminal electrodes may not be favorably brought into contact with each other and thus the capacitance of the entire multilayer capacitor may be reduced. In such a case, if the multiple third internal electrodes are disposed continuously in the lamination direction in the second capacitor unit, even if one of the third internal electrodes fails to make contact with the first external terminal electrode, another third internal electrode serves as a backup to generate a capacitance. Thus, a capacitance that does not deviate from the designed capacitance so much can be obtained. The same holds true for the fourth internal electrodes and second external terminal electrode.

Also, by adopting the preferred embodiments of the present invention, the wiring substrate dimension of the extended portion of each internal electrode of the first capacitor unit is made larger than that of the second capacitor unit. Thus, the current path from each internal electrode to the corresponding external terminal electrode is further spread. Therefore, if the multilayer capacitor according to the first preferred embodiment of the present invention is mounted in such a manner that the first capacitor unit is closer to the mount surface than the second capacitor unit, the current loop between the mount surface and multilayer capacitor is further spread so that the loop inductance is reduced. Particularly in a high frequency band, a current passing through a set of internal electrodes disposed in the lowermost layer of the multilayer capacitor significantly affects the ESL due to a skin effect. Therefore, the advantages achieved by preferred embodiments of the present invention become more remarkable.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 4A and 4B are sectional views showing third and fourth internal electrodes 19 and 20 included in the second capacitor unit 13 included in the capacitor body 8 of the multilayer capacitor 1 shown in FIG. 1.

DETAILED DESCRIPTION OF THE PREFERRED EMBODIMENTS

A first preferred embodiment of the present invention will be described with reference to FIGS. 1 to 4. The first preferred embodiment and second to sixth preferred embodiments according to the present invention to be described later relate to a first aspect of the present invention.

Figure 1:
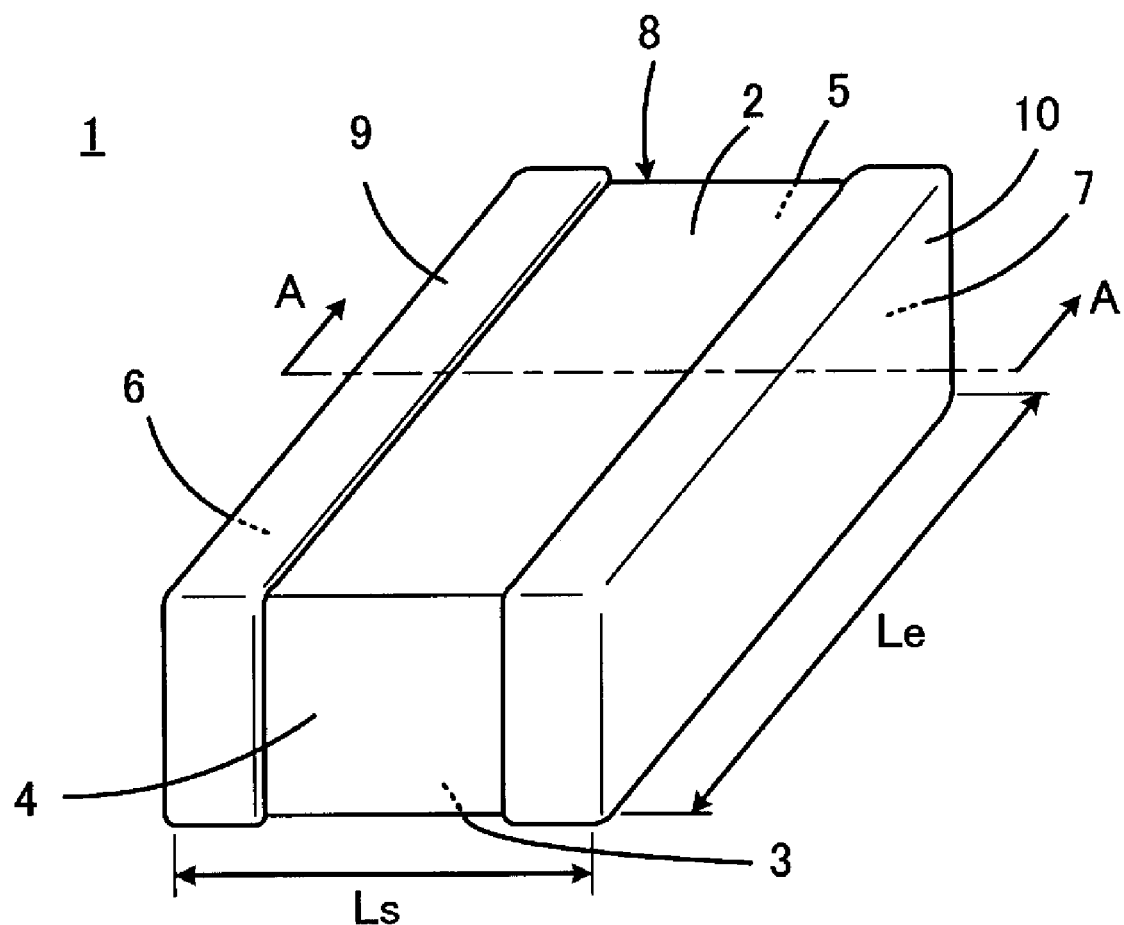
FIG. 1 is a perspective view showing an appearance of a multilayer capacitor 1 according to a first preferred embodiment of the present invention.

FIG. 1 is a perspective view showing an appearance of a multilayer capacitor 1 according to the first preferred embodiment. The multilayer capacitor 1 includes a capacitor body 8 preferably having a substantially rectangular parallelepiped shape and including first and second main surfaces 2 and 3 opposed to each other, first and second side surfaces 4 and 5 opposed to each other, and first and second end surfaces 6 and 7 opposed to each other. The multilayer capacitor 1 is of so-called "LW reverse type." That is, the length direction dimension Le of each of the first and second end surfaces 6 and 7 is larger than the length direction dimension Ls of each of the first and second side surfaces 4 and 5.

The first and second end surfaces 6 and 7 of the capacitor body 8 have first and second external terminal electrodes 9 and 10, respectively, provided thereon. In this preferred embodiment, the first and second external terminal electrodes 9 and 10 extend to portions of the first and second main surfaces 2 and 3 and portions of the first and second side surfaces 4 and 5.

The capacitor body 8 has a multilayer structure including laminated multiple dielectric layers 11 (see FIGS. 3 and 4). The first and second main surfaces 2 and 3 extend in the surface direction of the dielectric layers 11.

Figure 2:
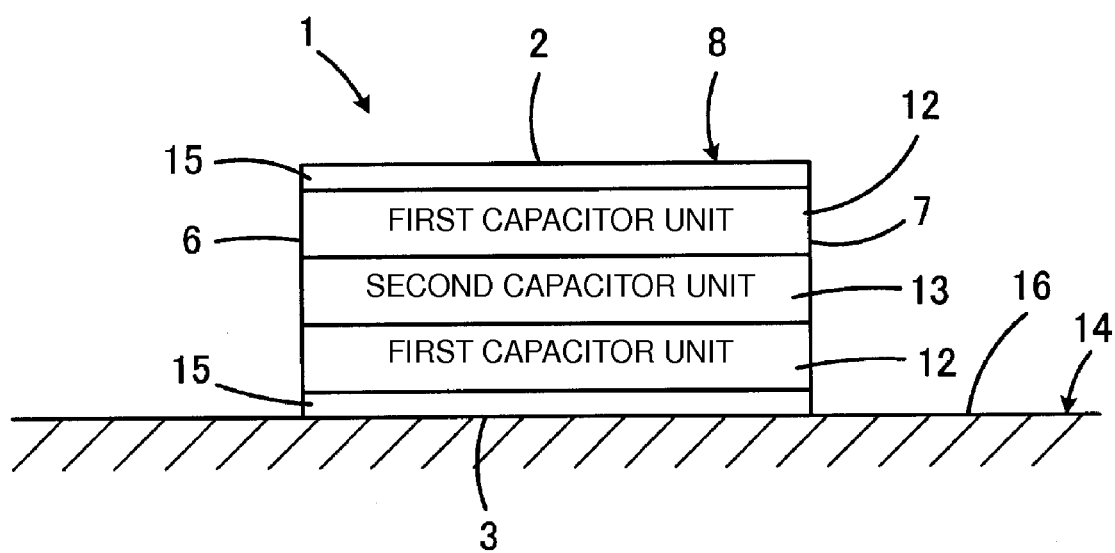
FIG. 2 is a sectional view including a section taken along line A-A of FIG. 1 to show the disposition state of first and second capacitor units 12 and 13 included in a capacitor body 8 of the multilayer capacitor 1 shown in FIG. 1 and a section of a mount substrate 14.

FIG. 2 is a sectional view including a section taken along line A-A of FIG. 1 to show the disposition state of first and second capacitor units 12 and 13 included in a capacitor body 8 and a section of a mount substrate 14. As shown in FIG. 2, the capacitor body 8 includes the two first capacitor units 12 and the single second capacitor unit 13, which are disposed in such a manner that the second capacitor unit 13 is interposed between the two first capacitor units 12 along the lamination direction of the dielectric layers 11. Disposed at both ends of the capacitor body 8 in the lamination direction are external layers 15, which do not function to generate a capacitance, rather than internal electrodes.

As shown in FIG. 2, the multilayer capacitor 1 is mounted in such a manner that the second main surface 3 of the capacitor body 8 faces a mount surface 16, which is a surface of the mount substrate 14. The lower first capacitor unit 12 is disposed in a position closer to the mount surface 16 than the second capacitor unit 13. The same holds true for a case (not shown) where the multilayer capacitor 1 is mounted in such a manner that the first main surface 2 of the capacitor body 8 faces the mount surface 16.

In FIG. 2, the disposition is made in such a manner that the single second capacitor unit 13 is interposed between the two first capacitor units 12. However, as long as the first capacitor units 12 are disposed at both ends of the capacitor body 8 in the lamination direction, another first capacitor unit 12 as well as the second capacitor unit 13 may be disposed in the intermediate portion in the lamination direction or two or more second capacitor units 13 may be disposed therein.

As shown in FIG. 3, each first capacitor unit 12 includes first and second internal electrodes 17 and 18. The first and second internal electrodes 17 and 18 are opposed to each other with a predetermined dielectric layer 11 interposed therebetween so that a capacitance is generated. As shown in FIG. 4, the second capacitor unit 13 includes third internal electrodes 19 and fourth internal electrodes 20. A single third internal electrode 19 and a single fourth internal electrode 20 are alternately disposed in the lamination direction in such a manner that each third internal electrode 19 and an adjacent fourth internal electrode 20 are opposed to each other with a predetermined dielectric layer 11 therebetween so that a capacitance is generated.

Figure 3A:
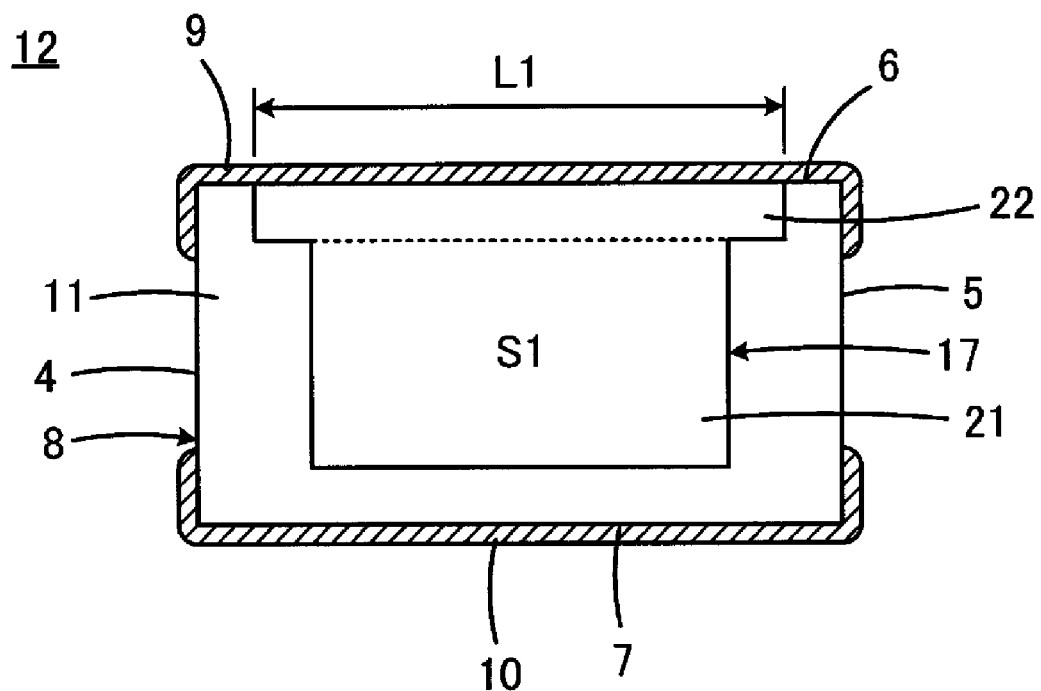
FIGS. 3A and 3B are sectional views showing first and second internal electrodes 17 and 18 of the first capacitor unit 12 included in the capacitor body 8 of the multilayer capacitor 1 shown in FIG. 1.
Figure 3B:
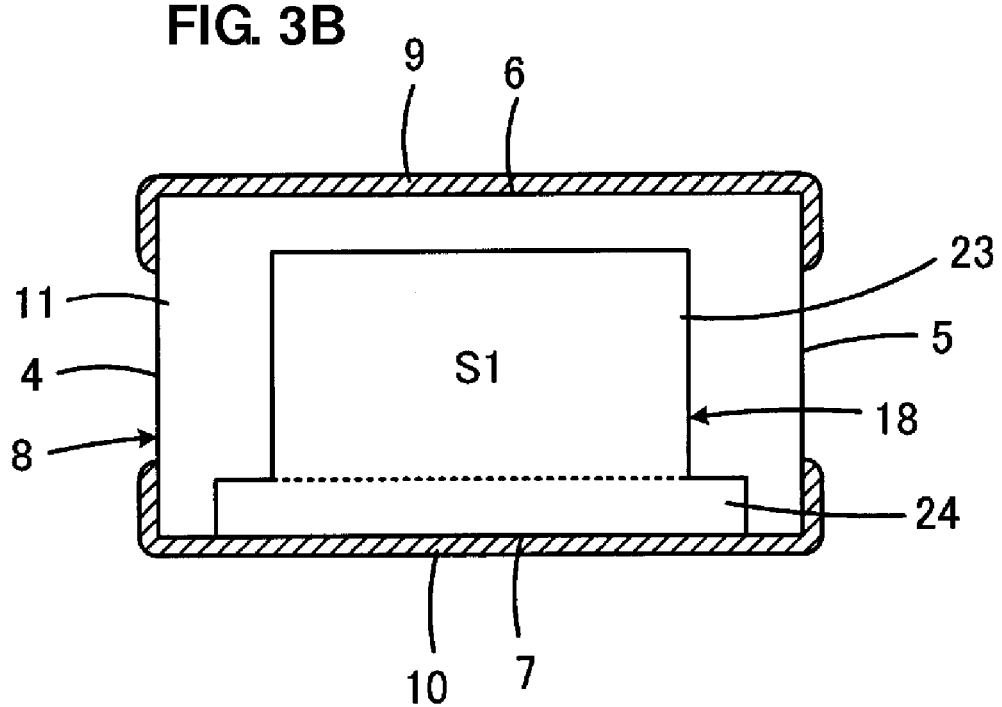
Figure 5A:
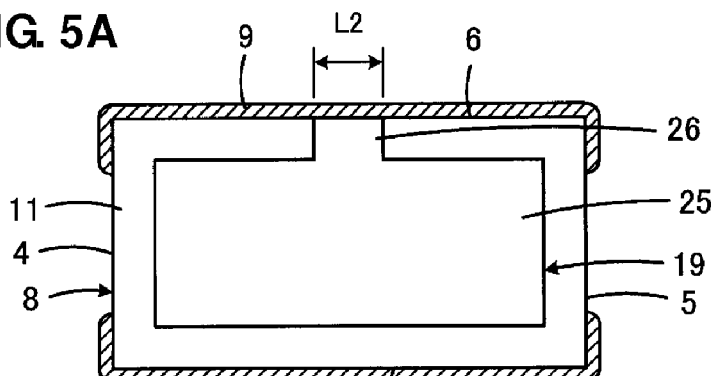
FIGS. 5A to 5D are drawings showing a second preferred embodiment of the present invention and corresponding to FIGS. 4A and 4B.
Figure 5B:
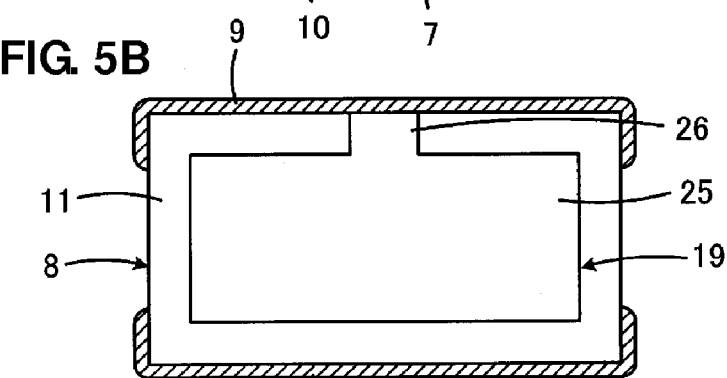
Figure 5C:
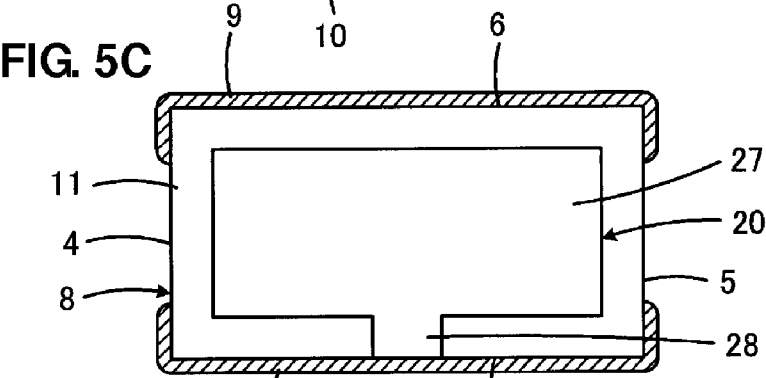
Figure 5D:
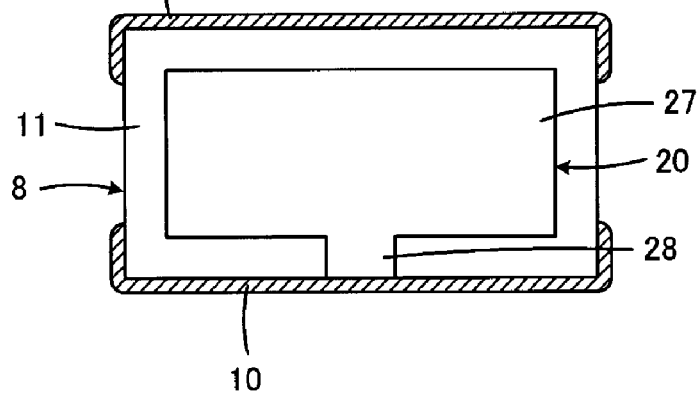

As shown in FIG. 3A, the first internal electrode 17 includes a first opposed portion 21 and a first extended portion 22 that is extended from the first opposed portion 21 to the first end surface 6 and that is electrically coupled to the first external terminal electrode 9. As shown in FIG. 3B, the second internal electrode 18 includes a second opposed portion 23 opposed to the first opposed portion 21 with the predetermined dielectric layer 11 therebetween and a second extended portion 24 that is extended from the second opposed portion 23 to the second end surface 7 and that is electrically coupled to the second external terminal electrode 10.

As shown in FIG. 4A, the third internal electrode 19 includes a third opposed portion 25 and a third extended portion 26 that is extended from the third opposed portion 25 to the first end surface 6 and that is electrically coupled to the first external terminal electrode 9. As shown in FIG. 4B, the fourth internal electrode 20 includes a fourth opposed portion 27 opposed to the third opposed portion 25 with the predetermined dielectric layer 11 therebetween and a fourth extended portion 28 that is extended from the fourth opposed portion 27 to the second end surface 7 and that is electrically coupled to the second external terminal electrode 10.

As is understood from FIGS. 3A and 4A, the width direction dimension L1 of the first extended portion 22 is larger than the width direction dimension L2 of the third extended portion 26. Similarly, as is understood from FIGS. 3B and 4B, the width direction dimension of the second extended portion 24 is larger than the width direction dimension of the fourth extended portion 28.

Also, as is understood from a comparison between FIGS. 3A and 3B and FIGS. 4A and 4B, the area S1 of each of the respective portions of the first and second opposed portions 21 and 22 that are opposed to each other is smaller than the area S2 of each of the respective portions of the third and fourth opposed portions 25 and 27 that are opposed to each other.

By adopting these configurations, the first and second extended portions 22 and 24 each have a wider current path. Therefore, the first capacitor unit 12 has a lower per-layer ESL. Also, the first capacitor unit 12 has a lower per-layer capacitance and a relatively high resonance frequency.

On the other hand, in the second capacitor unit 13, the third and fourth extended portions 26 and 28 each have a narrow current path. Therefore, the second capacitor unit 13 has a high per-layer ESR. Also, the second capacitor unit 13 has a high per-layer capacitance and a relatively low resonance frequency.

For these reasons, the multilayer capacitor 1 has a characteristic that is a combination of a low-ESL characteristic of the first capacitor unit 12 and a high-ESR characteristic of the second capacitor unit 13. This makes the multilayer capacitor 1 a low-ESL, high-ESR capacitor. Also, by changing the ratio between the contact areas of the first and second internal electrodes 17 and 18 and the external terminal electrodes 9 and 10 of the first capacitor unit 12 and the contact areas of the third and fourth internal electrodes 19 and 20 and the external terminal electrodes 9 and 10 of the second capacitor unit 13 or the ratio between the number of the laminated layers of the first and second internal electrodes 17 and 18 of the first capacitor unit 12 and the number of the laminated layers of the third and fourth internal electrodes 19 and 20 of the second capacitor unit 13, the position of the resonance point or ESR is easily controlled.

Also, if the number of the laminated layers of the first capacitor unit 12 and that of the second capacitor unit 13 are equal to each other, the first capacitor unit 12 has a lower capacitance. This makes it easy to separate the respective resonance points of the two capacitor units 12 and 13 from each other. This makes it easy to obtain broad frequency characteristics.

On the other hand, if the total capacitance of the first capacitor unit 12 and that of the second capacitor unit 13 are equalized by increasing the number of the laminated layers of the first capacitor unit 12, the ESL of the first capacitor unit 12 is significantly reduced. This also makes it easy to separate the positions of the resonance points of the two first and second capacitor units 12 and 13 from each other, thereby making it easy to obtain broad frequency characteristics.

As seen, the multilayer capacitor 1 has a high degree of flexibility in designing frequency characteristics.

In order to increase the ESR, it is preferable that the second capacitor unit 13 have a larger capacitance than that of the first capacitor unit 12. For that purpose, for example, the number of sets of a third internal electrode 19 and a fourth internal electrode 20 of the second capacitor unit 13 is preferably larger than the number of sets of a first internal electrode 17 and a second internal electrode 18 of the first capacitor unit 12.

Also, the width direction dimension L1 of the first and second extended portions 22 and 24 is larger than the width direction dimension L2 of the third and fourth extended portions 26 and 28. Therefore, the current path from the first internal electrode 17 to the first external terminal electrode 9 and the current path from the second internal electrode 18 to the second external terminal electrode 10 in the first capacitor unit 12 are further spread compared with the current path from the third internal electrode 19 to the first external terminal electrode 9 and the current path from the fourth internal electrode 20 to the second external terminal electrode 10 in the second capacitor unit 13. As shown in FIG. 2, in this preferred embodiment, the lower first capacitor unit 12 is disposed in such a manner that it is closer to the mount surface 16 than the second capacitor unit 13. Therefore, the current loop between the mount surface 16 and multilayer capacitor 1 is further spread so that the loop inductance is reduced. Particularly in a high frequency band, a current passing through the set of first and second internal electrodes 17 and 18 disposed in the lowest layer of the multilayer capacitor 1 significantly affects ESL due to a skin effect. Therefore, the above-mentioned advantages are more remarkable.

If the preferred embodiment having a configuration in which a second capacitor unit 13 is interposed between two first capacitor units 12 is adopted as in this preferred embodiment, one of the first capacitor units 12 is disposed in a position closer to the mount surface 16 than the second capacitor unit 13 even in a case (not shown) where the multilayer capacitor 1 is mounted in such a manner that the first main surface 2 of the capacitor body 8 faces the mount surface 16. For this reason, there is no need to distinguish the first main surface 2 from other surfaces when mounting the multilayer capacitor 1. This makes it possible to perform the mounting step efficiently.

If the above-mentioned advantage is not desired, the capacitor body 8 may include, for example, a single first capacitor unit 12 and a single second capacitor unit 13. In this case, it is preferable to mount the multilayer capacitor 1 in such a manner that the first capacitor unit 12 is disposed in a position closer to the mount surface 16 than the second capacitor unit 13.

The above-mentioned "per-layer ESR" is obtained, for example, as follows.

First, the ESR of a capacitor is obtained by the following formula.

$$\text{The ESR of a capacitor} = R(4N-2)/N^2$$

where R is a resistance per electrode layer and N is the number of the laminated layers.

Next, for the first capacitor unit 12, an inverse operation is performed using the ESR of the entire first capacitor unit 12 as the ESR of a capacitor. Thus, the resistance R per electrode layer is calculated. Then, the value of R is substituted into the above-mentioned formula. Further, the N=2 is substituted into the above-mentioned formula. Thus, the per-layer ESR is calculated.

The per-layer ESR may be fine-tuned, for example, by adjusting the resistivity of the material of the internal electrodes or adjusting the thickness of the internal electrodes.

In this preferred embodiment, the second and fourth extended portions 24 and 28 have the same relationship as that between the first and third extended portions 22 and 26. By adopting the above-mentioned configuration, the extended portions 22, 24, 26, and 28 are disposed in balance inside the capacitor body 8. This, for example, provides an advantage that the lamination state of the capacitor body 8 is stabilized, as well as enhances an effect of a reduction in ESL of the first capacitor unit 12 and an effect of an increase in ESR of the second capacitor unit 13. However, the second and fourth extended portions 24 and 28 do not always need to have the same relationship as that between the first and third extended portions 22 and 26 as in the shown preferred embodiment. This also holds true for other preferred embodiments to be described later.

Next, the elements of the multilayer capacitor 1 will be described in detail.

Each dielectric layer 11 is preferably made of, for example, dielectric ceramic containing $BaTiO_3$, $CaTiO_3$, $SrTiO_3$, $CaZrO_3$, or the like as the main ingredient. Each dielectric layer 11 may contain an MN compound, a Fe compound, a Cr compound, a Co compound, an Ni compound, or the like as a sub-ingredient along with such a main ingredient. The dielectric layer 11 preferably has a thickness of, for example, about 1 μm to about 10 μm.

As a conductive component of each of the internal electrodes 17 to 20, for example, Ni, Cu, Ag, Pd, Ag—Pd alloy, Au, or the like may be used. The internal electrodes 17 to 20 preferably contain an identical metal as a conductive component. After fired, the internal electrodes 17 to 20 each preferably have a thickness of about 0.5 μm to about 2.0 μm, for example.

As a conductive component of each of the external terminal electrodes 9 and 10, for example, Cu, Ni, Ag, Pd, Ag—Pd alloy, Au, or other suitable material may be used. The external terminal electrodes 9 and 10 may each have a structure including multiple layers. If Ni is used as a conductive components of each of the internal electrodes 17 to 20, it is preferable to use a base metal, such as Cu or Ni, as conductive components of the respective first layers of the external terminal electrodes 9 and 10 so as to enhance the adhesion between the internal electrodes 17 to 20 and external terminal electrodes 9 and 10.

The external terminal electrodes 9 and 10 may be formed by co-firing where the external terminal electrodes 9 and 10 and internal electrodes 17 to 20 are fired simultaneously, by post-firing where a conductive paste is applied and baked, or by direct plating. The external terminal electrodes 9 and 10 each preferably finally have a thickness of about 20 μm to about 100 μm, for example, in the thickest portions thereof.

A plate film may be formed on each of the external terminal electrodes 9 and 10. As a metal of which the plated film is made, for example, Cu, Ni, Ag, Pd, Ag—Pd alloy, Au, or the like may be used. The plated film may have a structure including multiple layers. Each layer preferably has a thickness of about 1 μm to about 10 μm, for example. A resin layer for relaxing stress may be formed between each of the external terminal electrodes 9 and 10 and the plated film.

Next, an example of a method for manufacturing the above-mentioned multilayer capacitor 1 will be described.

First, ceramic green sheets to be made into the dielectric layers 11, a conductive paste for the internal electrodes 17 to 20, and a conductive paste for the external terminal electrodes 9 and 10 are prepared. The ceramic green sheets and conductive pastes each contain a binder and a solvent. As such binders and solvents, known organic binders and organic solvents may be used. The conductive paste for the external terminal electrodes 9 and 10 often contains a glass component.

Next, the conductive paste is printed on each ceramic green sheet in a predetermined pattern, for example, by screen printing or other suitable process. Thus, the ceramic greens sheets having conductive paste films to be made into the internal electrodes 17 to 20 formed thereon are obtained.

Next, a predetermined number of ceramic green sheets having the conductive paste films formed thereon as described above are laminated in a predetermined order. Then, a predetermined number of outer layer ceramic green sheets having no conductive paste films formed thereon are laminated on each of the outmost ones of the laminated ceramic green sheets. Thus, a raw mother multilayer body is obtained. The raw mother multilayer body is crimped in the lamination direction as necessary preferably by, e.g., isostatic pressing.

Next, the raw mother multilayer body is cut into a raw capacitor body 8 of predetermined size.

Next, the raw capacitors body 8 is fired. Depending on a ceramic material contained in the ceramic green sheets or a metal material contained in the conductive paste films, the firing temperature is preferably selected from the range of, for example, about 900° C. to about 1300° C.

Next, the conductive paste is applied and baked to the first and second end surfaces 6 and 7 of the fired capacitor body 8. Thus, the external terminal electrodes 9 and 10 are formed. The baking temperature is preferably in the range of about 700° C. to about 900° C., for example. As an atmosphere for baking, an atmosphere such as air, $N_2$, or water vapor plus $N_2$ is selectively used in accordance with the type of a metal contained in the conductive paste.

Next, surfaces of the external terminal electrodes 9 and 10 are plated as necessary. Thus, the multilayer capacitor 1 is completed.

Hereafter, the second to sixth preferred embodiments of the present invention will be described with reference to FIGS. 5 to 9. Multilayer capacitors according to the second to sixth preferred embodiments are the same as the above-mentioned multilayer capacitor 1 according to the first preferred embodiment shown in FIG. 1 with respect to the appearance, the disposition state of the first and second capacitor units 12 and 13, and the like.

FIGS. 5, 7, 8, and 9 correspond to FIG. 4. The elements of FIGS. 5, 7, 8, and 9 corresponding to those of FIG. 4 are given same reference numerals and will not be repeatedly described. Also, FIG. 6 corresponds to FIG. 3. The elements of FIG. 6 corresponding to those of FIG. 3 are given same reference numerals and will not be repeatedly described.

In the second capacitor unit 13 according to the second preferred embodiment, as shown in FIGS. 5A to 5D sequentially, two third internal electrodes 19 and two fourth internal electrodes 20 are alternately arranged. The contact area between each third internal electrode 19 and the first external terminal electrode 9 and the contact area between each fourth internal electrode 20 and the second external terminal electrode 10 are both relatively small. For this reason, the third and fourth internal electrodes 19 and 20 may not effectively make contact with the external terminal electrodes 9 and 10, respectively, and thus the capacitance of the entire multilayer capacitor may be reduced. By adopting the second preferred embodiment, two third internal electrodes 19 and two fourth internal electrodes 20 are laminated continuously. Therefore, even if one of any same type of adjacent two internal electrodes loses contact with the corresponding external terminal electrode, the other one serves as a backup to generate a capacitance. Therefore, a capacitance that does not deviate from the designed capacitance so much can be obtained.

It is sufficient to arrange multiple third internal electrodes 19 and multiple fourth internal electrodes 20 alternately. For example, three or more internal electrodes 19 and three or more fourth internal electrodes 20 may be arranged alternately.

In the second preferred embodiment, not only the width direction dimension of the third extended portion 26 of each third internal electrode 19 but also that of the fourth extended portion 28 of each fourth internal electrode 20 is relatively small. However, if the width direction dimension of the fourth extended portion 28 of each fourth internal electrode 20 is not relatively small, for example, if each fourth extended portion 28 has the same width direction dimension as that of the corresponding fourth opposed portion 27, it is not necessary to arrange multiple fourth internal electrodes 20 continuously in the lamination direction.

Figure 6A:
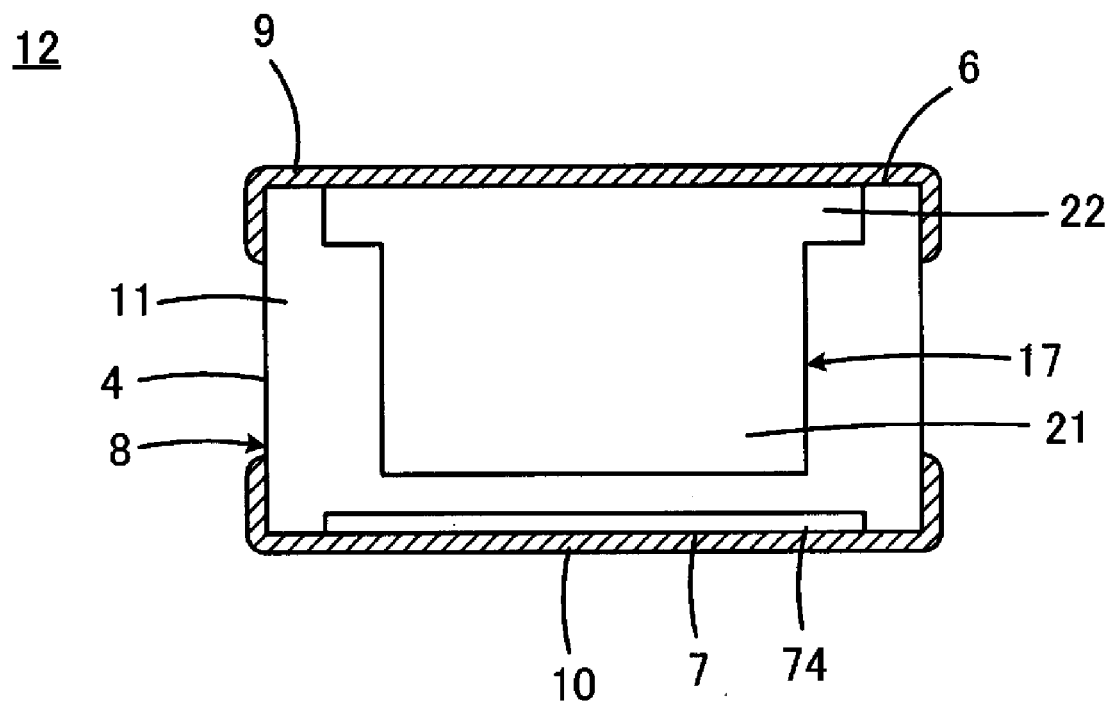
FIGS. 6A and 6B are drawings showing a third preferred embodiment of the present invention and corresponding to FIGS. 3A and 3B.
Figure 6B:
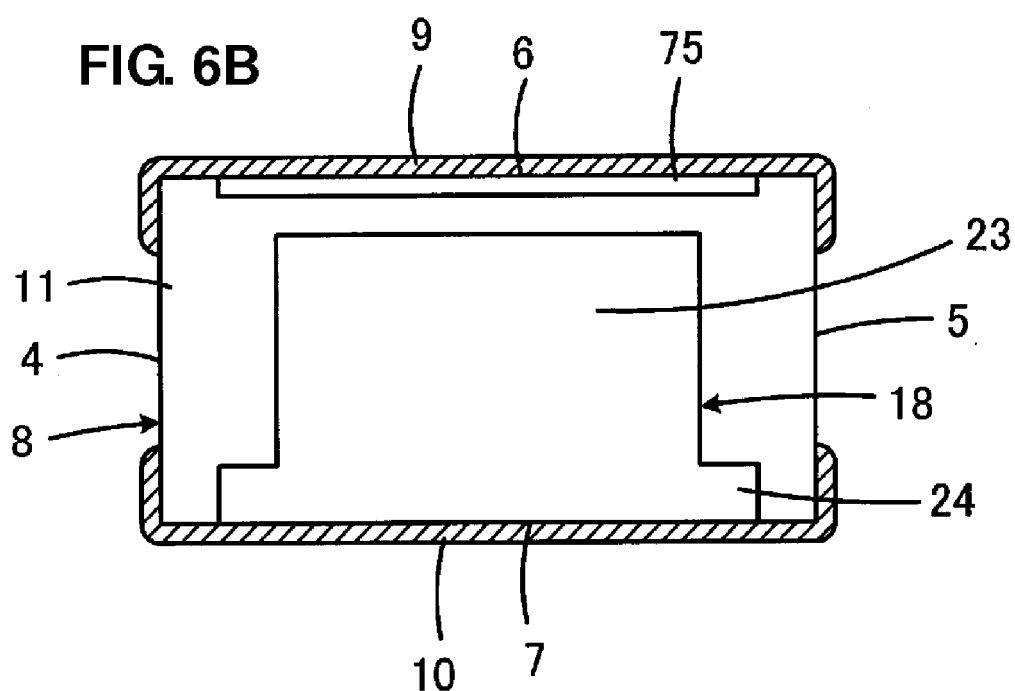

In the third preferred embodiment shown in FIGS. 6A and 6B, the first capacitor unit 12 includes dummy electrodes 74 and 75. More specifically, as shown in FIG. 6A, the dummy electrode 74 is arranged so that it is exposed to the second end surface 7 in a manner flush with the first internal electrode 17. On the other hand, as shown in FIG. 6B, the dummy electrode 75 is formed so that it is exposed to the second end surface 18 in a manner flush with the second internal electrode 18. The width direction dimension of the dummy electrode 74 is preferably the same as that of the exposed edge of the first extended portion 22 of the flush first internal electrode 17. The width direction dimension of the dummy electrode 75 is preferably the same as that of the exposed edge of the second extended portion 24 of the flush second internal electrode 18.

By forming the dummy electrodes 74 and 75 as in the third preferred embodiment, not only the first and second internal electrodes 17 and 18 but also the dummy electrodes 74 and 75 are bonded to the external terminal electrodes 9 and 10. Therefore, the number of the bonded portions is increased. As a result, the adhesion of the external terminal electrodes 9 and to the capacitor body 8 is improved. Also, for the third preferred embodiment, if the external terminal electrodes 9 and 10 are formed on surfaces of the capacitor body 8 preferably by direct plating, the number of portions serving as the cores for plate deposition is increased. Thus, the adhesion of the external terminal electrodes 9 to 10 is improved and the plating time is reduced.

Figure 7A:
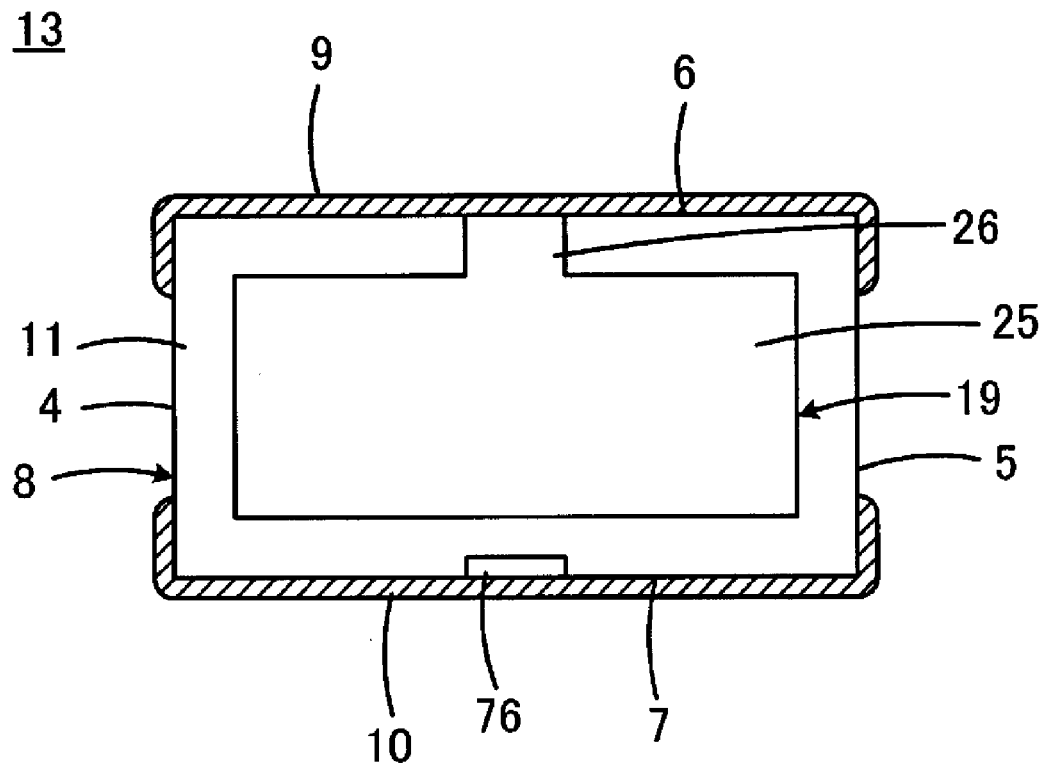
FIGS. 7A and 7B are drawings showing a fourth preferred embodiment of the present invention and corresponding to FIGS. 4A and 4B.
Figure 7B:
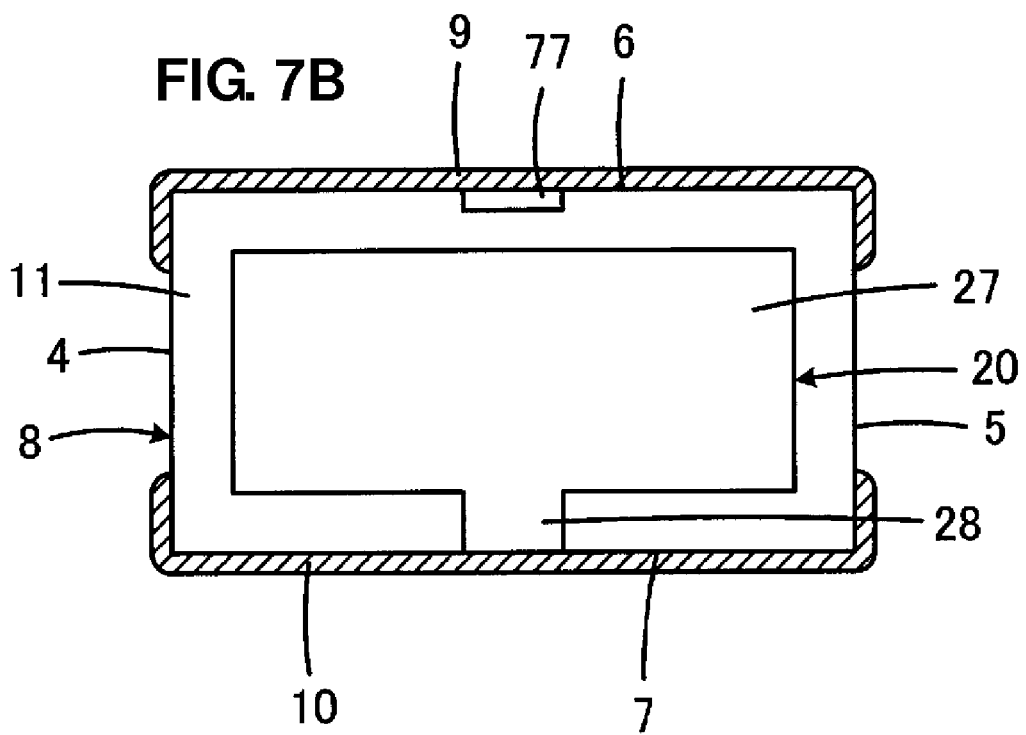

In the fourth preferred embodiment shown in FIGS. 7A and 7B, the second capacitor 13 includes dummy electrodes 76 and 77. More specifically, as shown in FIG. 7A, the dummy electrode 76 is arranged so that it is exposed to the second end surface 7 in a manner flush with the third internal electrode 19. On the other hand, as shown in FIG. 7B, the dummy electrode 77 is arranged so that it is exposed to the first end surface 6 in a manner flush with the fourth internal electrode 20. The width direction dimension of the dummy electrode 76 is preferably the same as that of the exposed edge of the third extended portion 26 of the flush third internal electrode 19. The width direction dimension of the dummy electrode 77 is preferably the same as that of the exposed edge of the fourth extended portion 28 of the flush fourth internal electrode 20.

The fourth preferred embodiment achieves the same advantages as that of the above-mentioned third preferred embodiment.

Figure 8A:
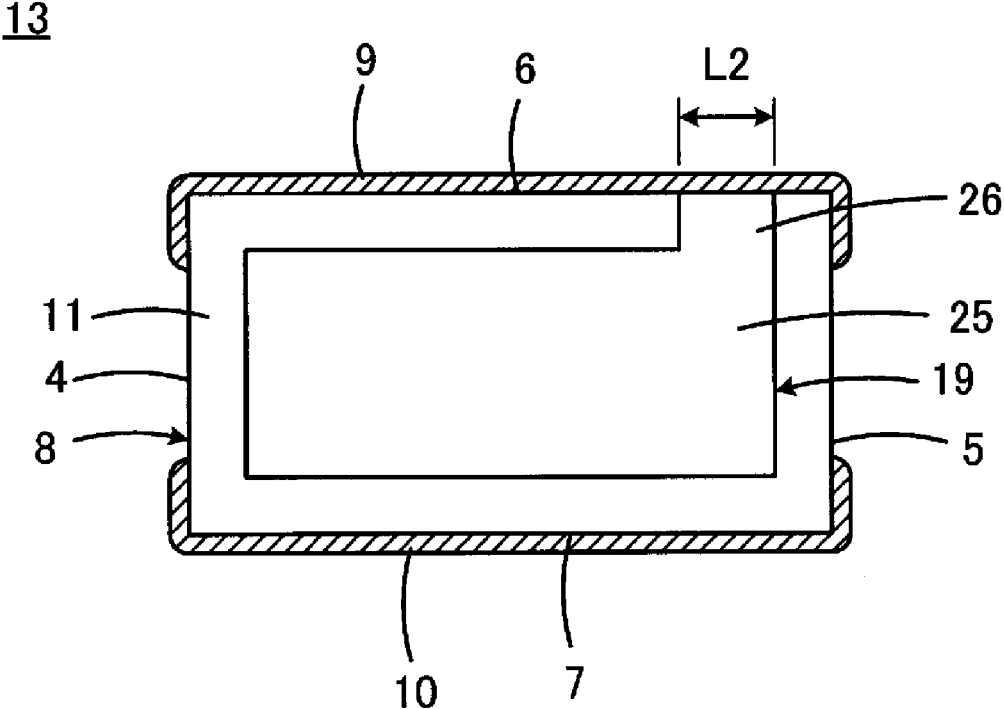
FIGS. 8A and 8B are drawings showing a fifth preferred embodiment of the present invention and corresponding to FIGS. 4A and 4B.
Figure 8B:
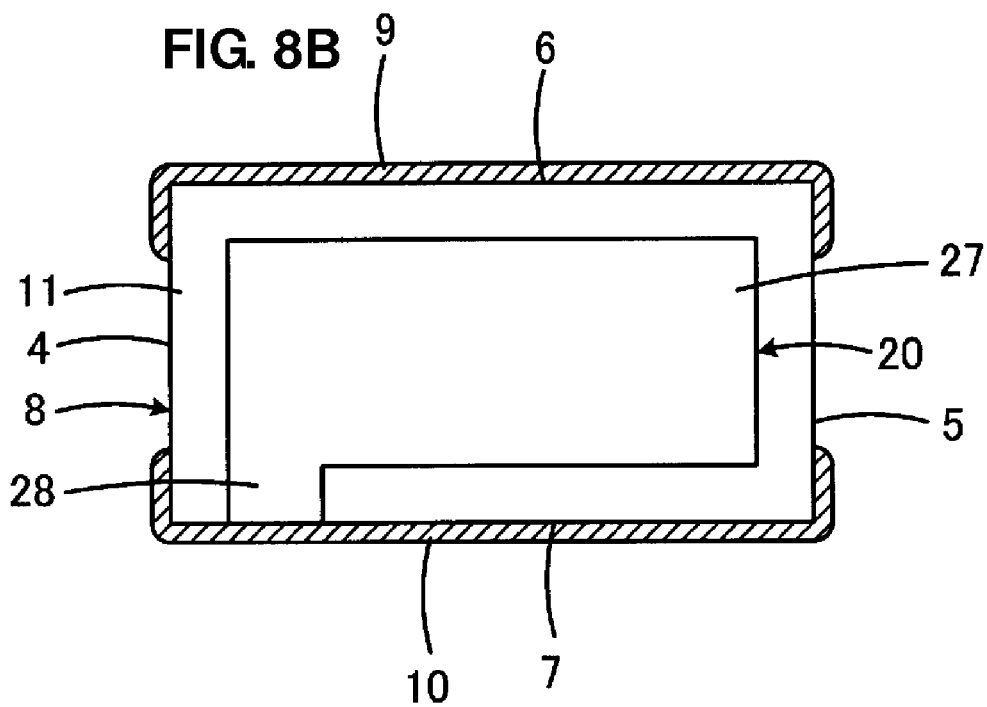

In the second capacitor unit 13 according to the fifth preferred embodiment shown in FIGS. 8A and 8B, the third extended portion 26 and fourth extended portion 28 of the third internal electrode 19 and fourth internal electrode 20, respectively, extend not from the central portions of the third opposed portion 25 and fourth opposed portion 27, respectively, but from the edges thereof. As seen, by changing the portions of the third and fourth opposed portions 25 and 27, from which the extended portions 26 and 28 extend, to the central portions thereof, the edges thereof, intermediate portions between these portions, or the like, it is possible to change the current paths from lands formed on the mount surface 16 (see FIG. 2) to the extended portions 26 and 28 via the external terminal electrodes 9 and 10. This makes it possible to fine-tune the ESR using resistance components of the external terminal electrodes 9 and 10 themselves.

Figure 9A:
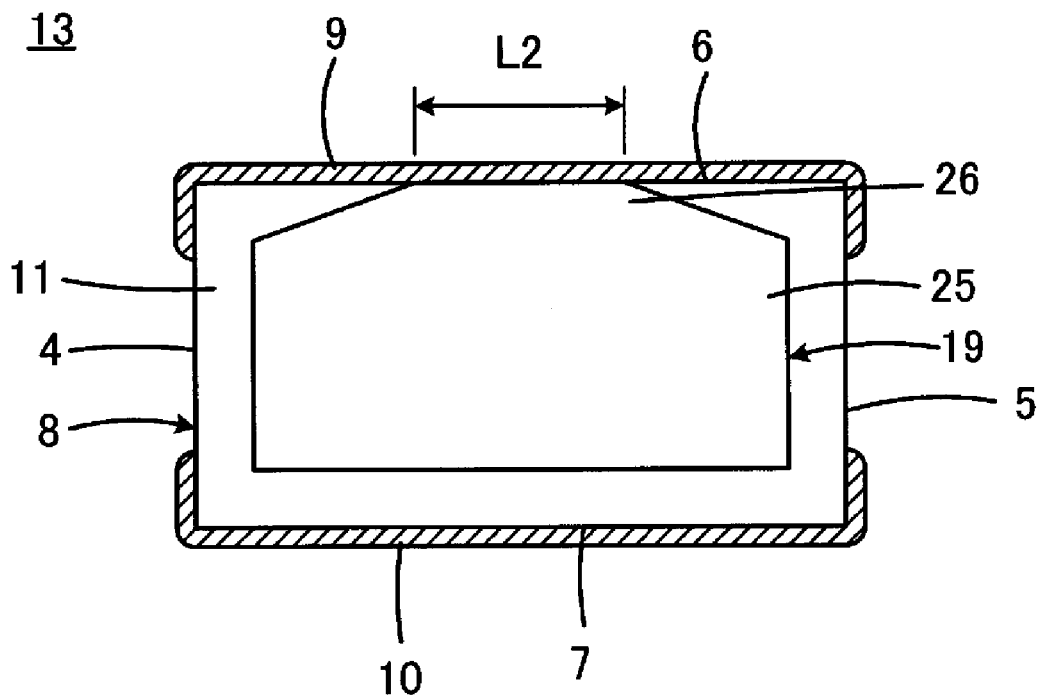
FIGS. 9A and 9B are drawings showing a sixth preferred embodiment of the present invention and corresponding to FIGS. 4A and 4B.
Figure 9B:
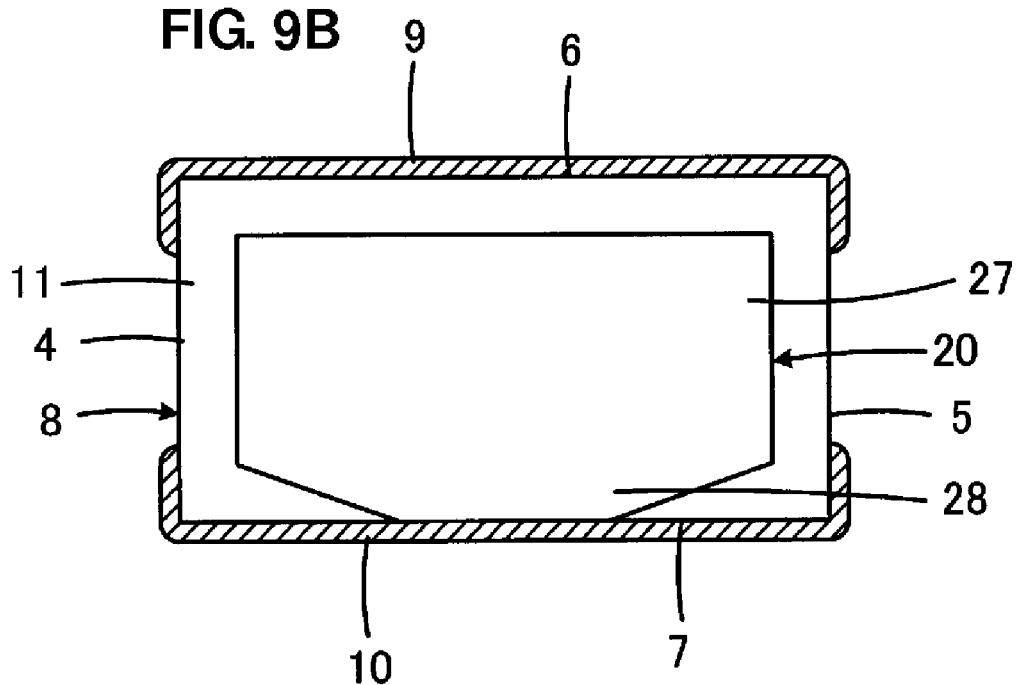

In the second capacitor unit 13 according to the sixth preferred embodiment shown in FIG. 9, the third and fourth extended portions 26 and 28 of the third and fourth internal electrodes 19 and 20, respectively, extend from the third and fourth opposed portions 25 and 27, respectively, to the first and second end surfaces 6 and 7, respectively, in a tapered manner. Use of the above-mentioned configuration makes it easier to spread the current paths from the extended portions 26 and 28 to the third and fourth opposed portions 25 and 27, respectively. Thus, the ESL can be reduced.

Figure 10:
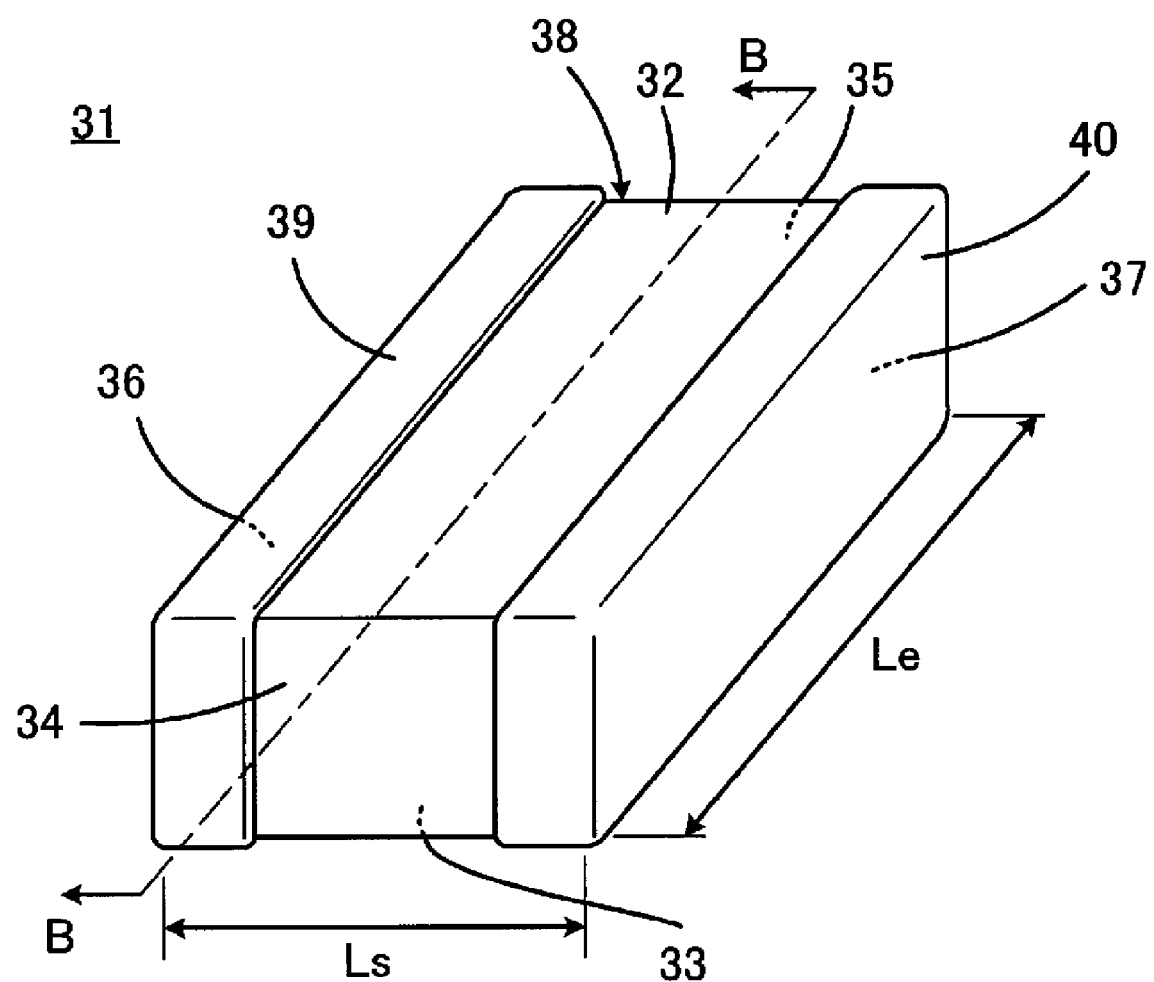
FIG. 10 is a perspective view of an appearance of a multilayer capacitor 31 according to a seventh preferred embodiment of the present invention.

FIGS. 10 to 13 show the seventh preferred embodiment of the present invention. FIG. 10, which corresponds to FIG. 1, is a perspective view showing an appearance of a multilayer capacitor 31 according to the seventh preferred embodiment. The seventh preferred embodiment and eleventh to twelfth preferred embodiments of the present invention to be described later belong to the second aspect of the present invention.

The multilayer capacitor 31 includes a capacitor body 38 preferably having a substantially rectangular parallelepiped shape and including first and second main surfaces 32 and 33 opposed to each other, first and second side surfaces 34 and 35 opposed to each other, and first and second end surfaces 36 and 37 opposed to each other. As with the above-mentioned multilayer capacitor 1, the multilayer capacitor 31 is of so-called "LW reverse type". That is, the length direction dimension Le of each of the first and second end surfaces 36 and 37 is larger than the length direction dimension Ls of each of the first and second side surfaces 34 and 35.

Also, the multilayer capacitor 31 includes first and second external terminal electrodes 39 and 40, which are formed at least on a second main surface 33 of the capacitor body 38 in such a manner that the external terminal electrodes are insulated from each other. In this preferred embodiment, the first external terminal electrode 39 extends from the second main surface 33 to a first end surface 36, respective portions of first and second side surfaces 34 and 35, and a portion of a first main surface 32. The second external terminal electrode 40 extends from the second main surface 33, a second end surface 37, respective portions of the first and second side surfaces 34 and 35, and a portion of the first main surface 32.

The capacitor body 38 has a multilayer structure including laminated multiple dielectric layers 41 (see FIGS. 12 and 13). One of the unique features of the seventh preferred embodiment is that the first and second side surfaces 34 and 35 extend in the surface direction of the dielectric layers 41.

Figure 11:
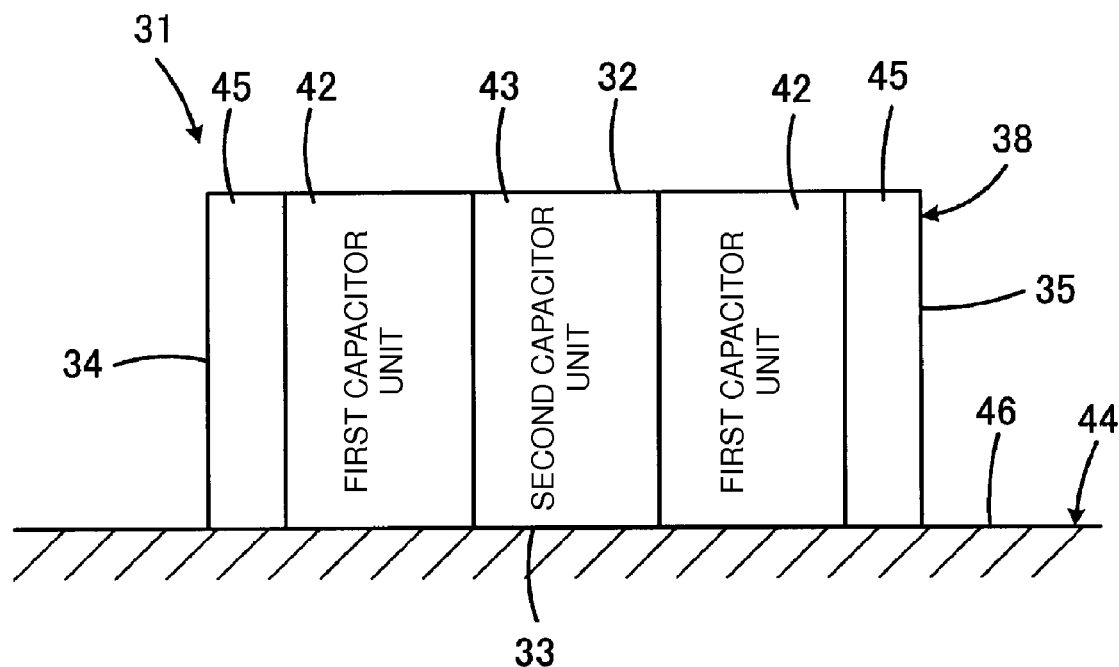
FIG. 11 is a sectional view including a section taken along line B-B of FIG. 10 to show the disposition state of first and second capacitor units 42 and 43 included in a capacitor body 38 of the multilayer capacitor 31 shown in FIG. 10 and a section of a mount substrate 44.

FIG. 11, which corresponds to above-mentioned FIG. 2, is a sectional view including a section taken along line B-B of FIG. 10 to show the disposition state of first and second capacitor units 42 and 43 included in a capacitor body 38 and a section of a mount substrate 44. As shown in FIG. 11, the capacitor body 38 includes the first capacitor units 42 and second capacitor unit 43 disposed in the lamination direction of the dielectric layers 41. In this preferred embodiment, the single second capacitor unit 43 is interposed between the two first capacitor units 42, and outer layers 45 that do not serve to generate a capacitance are provided at both edges of the capacitor body 38 in the lamination direction. In the seventh preferred embodiment, the disposition state of the first and second capacitor units 42 and 43 may be arbitrarily changed.

The multilayer capacitor 31 is mounted in such a manner that the second main surface 33 of the capacitor body 38 faces a mount surface 46, which is a surface of the mount substrate 44. Therefore, it is sufficient to form the first and second external terminal electrodes 39 and 40 on at least the second main surface 33 of the capacitor body 38 as described above.

Figure 12A:
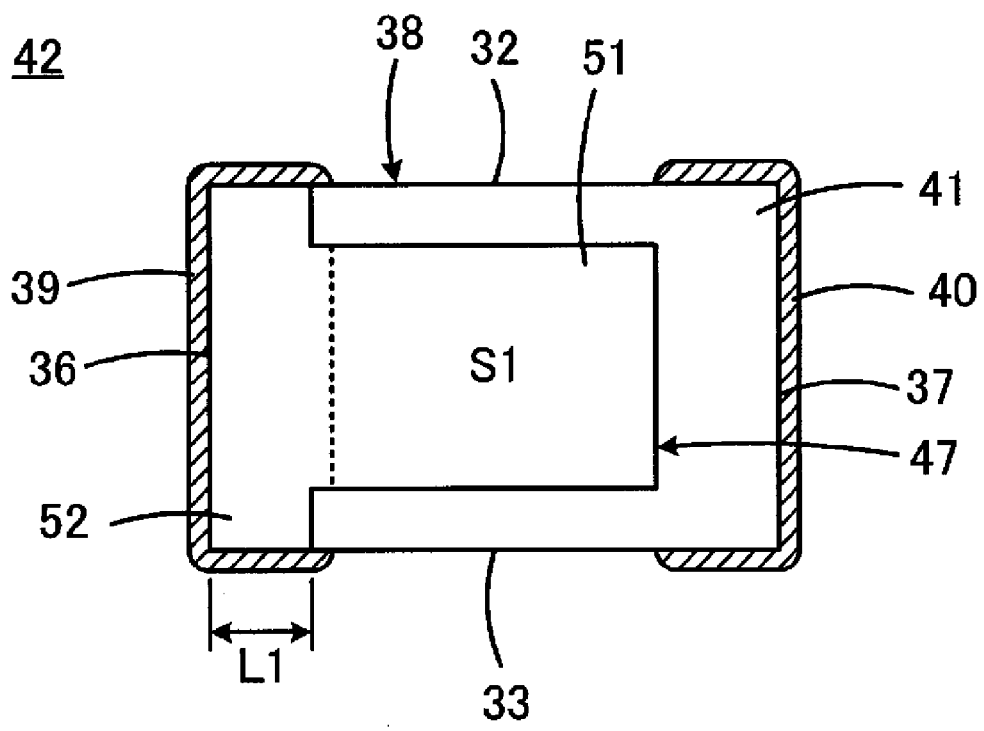
FIGS. 12A and 12B are sectional views showing first and second internal electrodes 47 and 48 included in the first capacitor unit 42 included in the capacitor body 38 of the multilayer capacitor 31 shown in FIG. 10.
Figure 12B:
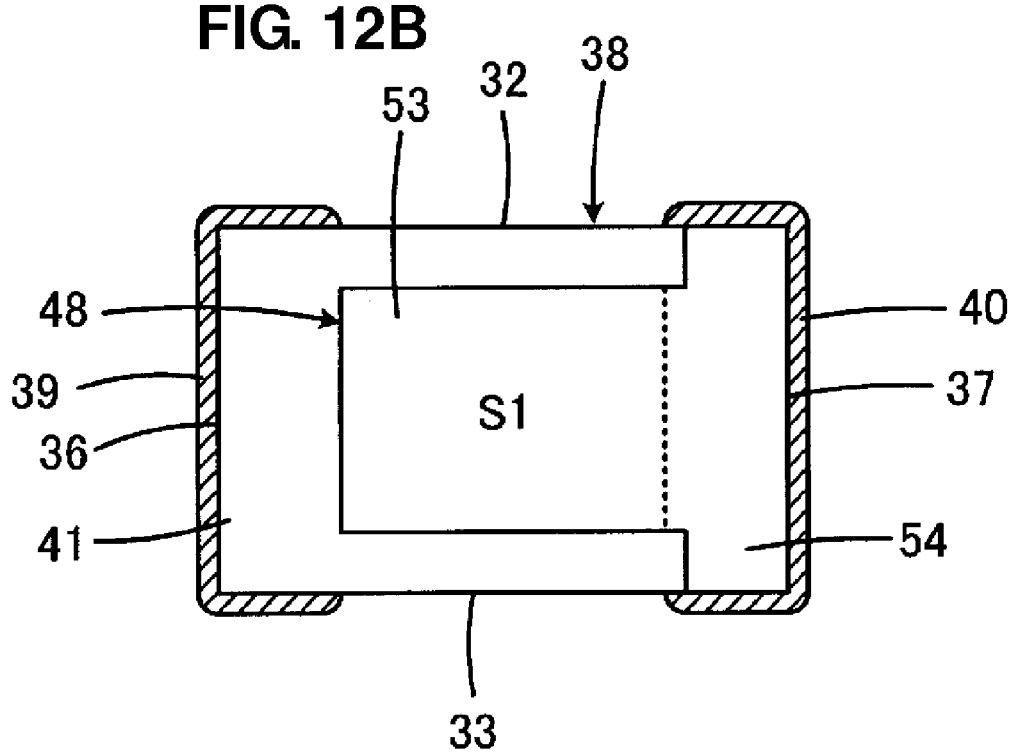
Figure 13A:
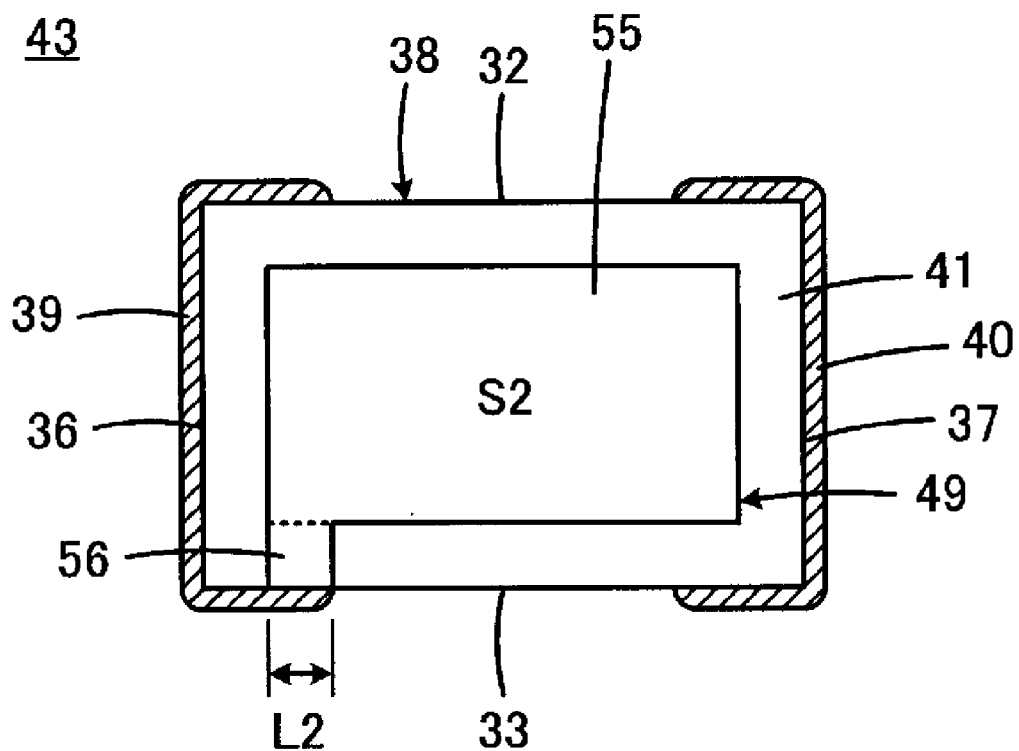
FIGS. 13A and 13B are sectional views showing third and fourth internal electrodes 49 and 50 included in the second capacitor unit 43 included in the capacitor body 38 of the multilayer capacitor 31 shown in FIG. 10.
Figure 13B:
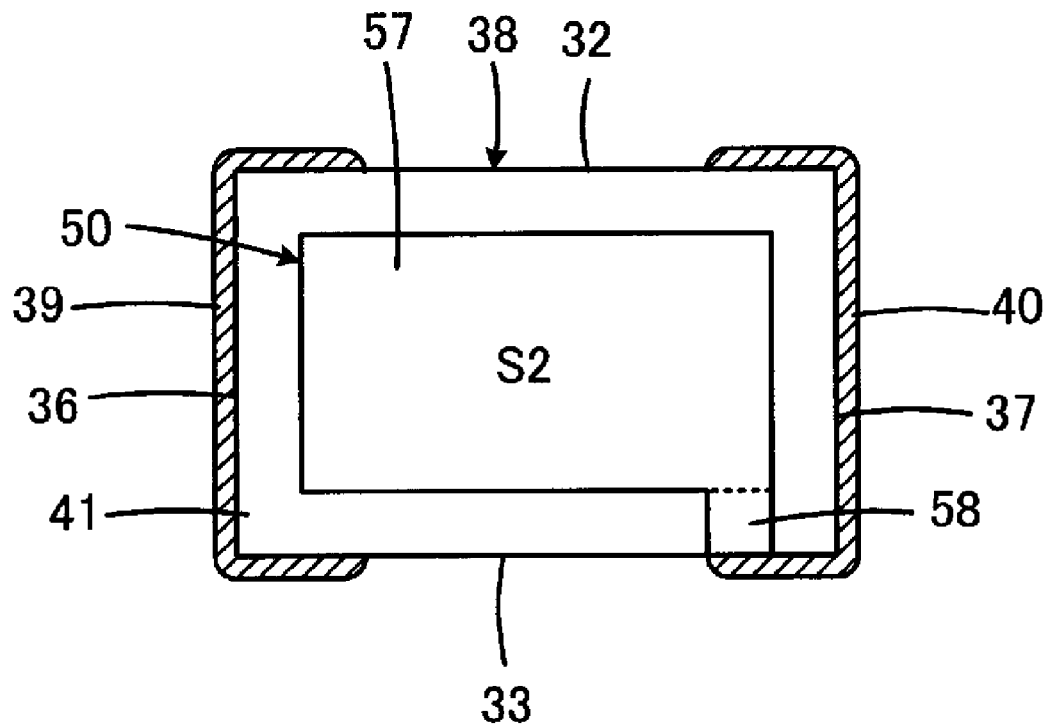

As shown in FIGS. 12A and 12B, each first capacitor unit 42 includes first and second internal electrodes 47 and 48. The first and second internal electrodes 47 and 48 are opposed to each other with a predetermined dielectric layer 41 interposed between so that a capacitance is formed. As shown in FIGS. 13A and 13B, the second capacitor 13 includes third and fourth internal electrodes 49 and 50. The third and fourth internal electrodes 49 and 50 are opposed to each other with a predetermined dielectric layer 41 interposed between so that a capacitance is generated.

As shown in FIG. 12A, the first internal electrode 47 includes a first opposed portion 51 and a first extended portion that is extended from the first opposed portion 51 to at least the second end surface 33 and that is electrically coupled to the first external terminal electrode 39. As shown in FIG. 12B, the second internal electrode 48 includes a second opposed portion 53 opposed to the first opposed portion 51 with the predetermined dielectric layer 41 interposed therebetween and a second extended portion 54 that is extended from the second opposed portion 53 to at least the second end surface 33 and that is electrically coupled to the second external terminal electrode 40.

As shown in FIG. 13A, the third internal electrode 49 includes a third opposed portion 55 and a third extended portion that is extended from the third opposed portion 55 to the second end surface 33 and that is electrically coupled to the first external terminal electrode 39. As shown in FIG. 13B, the fourth internal electrode 50 includes a fourth opposed portion opposed to the third opposed portion 55 with the predetermined dielectric layer 41 interposed therebetween and a fourth extended portion 58 that is extended from the fourth opposed portion 57 to the second main surface 33 and that is electrically coupled to the second external terminal electrode 40.

As is understood from FIGS. 12A and 13A, the width direction dimension L1 of the first extended portion 52 is larger than the width direction dimension L2 of the third extended portion 56. Similarly, as is understood from FIGS. 12B and 13B, the width direction dimension of the second extended portion 54 is larger than the width direction dimension of the fourth extended portion 58.

Also, as is understood from a comparison between FIGS. 12A and 12B and FIGS. 13A and 13B, the area S1 of each of the respective portions of the first and second opposed portions 51 and 53 that are opposed to each other is smaller than the area S2 of each of the respective portions of the third and fourth opposed portions 55 and 57 that are opposed to each other.

Also in this preferred embodiment configured as described above, the first and second extended portions 52 and 54 each have a wider current path and thus the first capacitor unit 42 has a lower per-layer ESL. Also, the first capacitor unit 42 has a lower per-layer capacitance and thus has a relatively high resonance frequency.

On the other hand, in the second capacitor unit 43, the third and fourth extended portions 56 and 58 each have a narrower current path. Thus, the second capacitor unit 43 has a higher per-layer ESR. Also, the second capacitor unit 43 has a higher per-layer capacitance and thus has a lower resonance frequency.

Thus, as with the above-mentioned multilayer capacitor 1, the multilayer capacitor 31 has a characteristic that is a combination of a low-ESL characteristic of the first capacitor unit 42 and a high-ESR characteristic of the second capacitor unit 43. This makes the multilayer capacitor 31 a low-ESL, high-ESR capacitor. Also, by changing the ratio between the contact areas of the internal electrodes 47 and 48 and the external terminal electrodes 39 and 40 of the first capacitor unit 42 and the contact areas of the internal electrodes 49 and 50 and the external terminal electrodes 39 and 40 of the second capacitor unit 43 or the ratio between the number of the laminated layers of the internal electrodes 47 and 48 of the first capacitor unit and the number of the laminated layers of the internal electrodes 49 and 50 of the second capacitor unit 43, the position of the resonance point or ESR is easily controlled.

Also, if the number of the laminated layers of the first capacitor 42 is equal to that of the second capacitor 43, the first capacitor 42 has a lower capacitance. This makes it easy to separate the resonance points of the two capacitor units 42 and 43 from each other. This makes it easy to obtain broad frequency characteristics.

On the other hand, if the total capacitance of the first capacitor 42 and that of the second capacitor 43 are equalized by increasing the number of the laminated layers of the first capacitor 42, the ESL of the first capacitor 42 is significantly reduced. This also makes it easy to separate the positions of the resonance points of the two capacitor units 42 and 43 from each other, thereby making it easy to obtain broad frequency characteristics.

For the above-mentioned reasons, the multilayer capacitor 31 according to this preferred embodiment also has a high degree of flexibility in designing frequency characteristics.

Also, since the third and fourth extended portions 56 and 58 are extended to the second main surface 33 as described above, the path from the mount surface 46 (see FIG. 11) to the second capacitor unit 43 is short. This also reduces the ESL of the entire multilayer capacitor 31.

In this preferred embodiment, as shown in FIG. 12A, the first extended portion 52 is extended not only to the second main surface 33 but also to the first end surface 36 and first main surface 32. That is, the first internal electrode 47 takes the shape of T. Incidentally, when comparing the width direction dimension L1 of the first extended portion 52 with the width direction dimension L2 of the third extended portion 56, the width direction dimension of the first extended portion 52 exposed on the first end surface 36 or the first main surface 32 may be taken into account. However, as described above, the current loop between the mount surface 46 and multilayer capacitor 31 is dominant, particularly in a high frequency band; therefore, it is sufficient to use only the width direction dimension L1 of the first extended portion 52 exposed on the second main surface 33 as a target for the comparison.

As described above, it is mechanically meaningful that the first extended portion 52 is extended to the first end surface 36 and first main surface 32. That is, the adhesion between the first internal electrode 47 and first external terminal electrode 39 is enhanced and thus the adhesion of the first external terminal electrode 39 to the capacitor body 38 is improved.

In this preferred embodiment, the second and fourth extended portions 56 and 58 have the same relationship as that between the first and third extended portions 52 and 56; however, such a configuration is not always required. If the second and fourth extended portions 56 and 58 have the same relationship as that between the first and third extended portions 52 and 56 as in this preferred embodiment, the extended portions 52, 54, 56, and 58 are disposed in balance inside the capacitor body 38. Therefore, for example, an advantage that the lamination state of the capacitor body 38 is stabilized can be expected. Also, it is possible to further enhance of an effect of a reduction in ESL of the first capacitor unit 42 and an effect of an increase in ESR of the second capacitor unit 43.

Figure 17A:
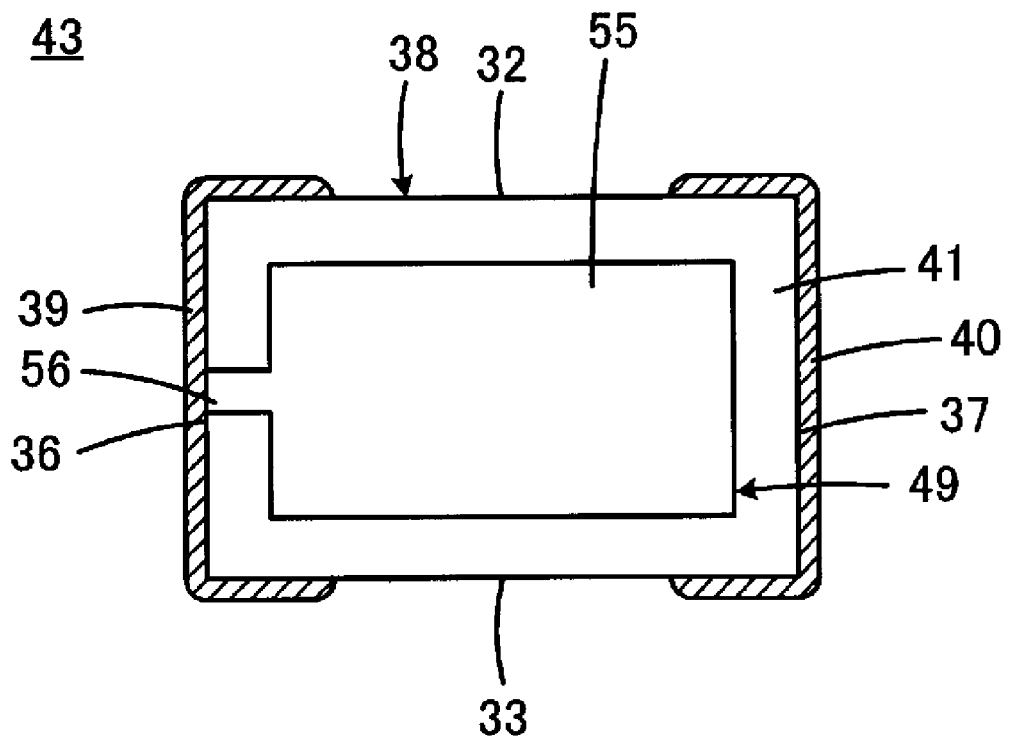
FIGS. 17A and 17B are drawings showing an eleventh preferred embodiment of the present invention and corresponding to FIGS. 13A and 13B.
Figure 17B:
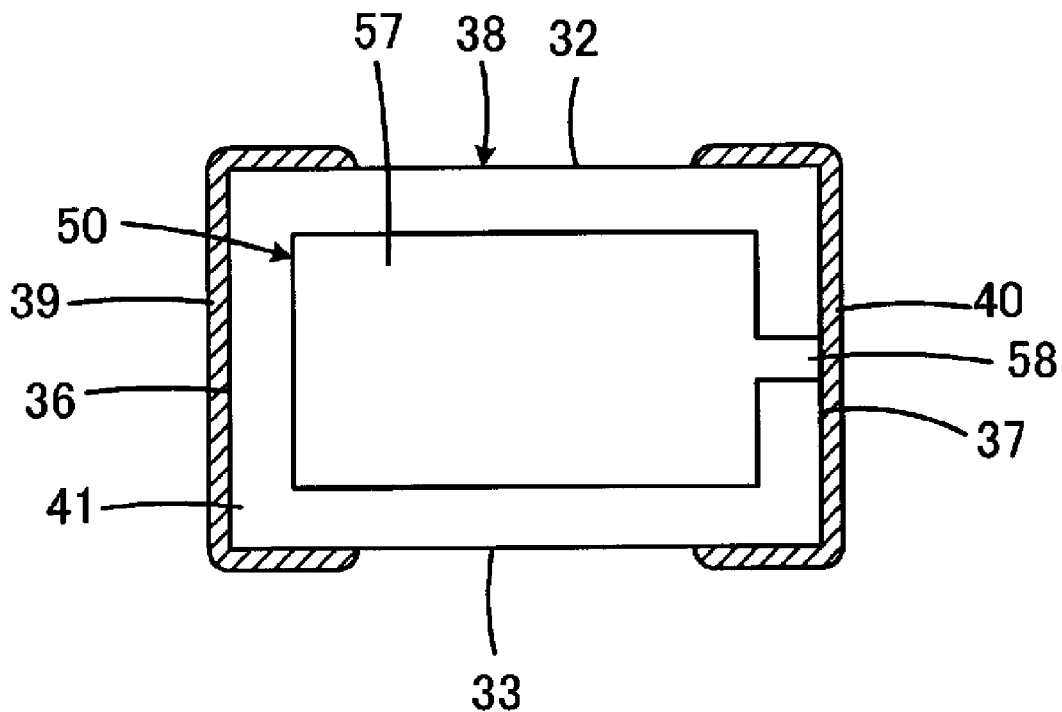
Figure 18:
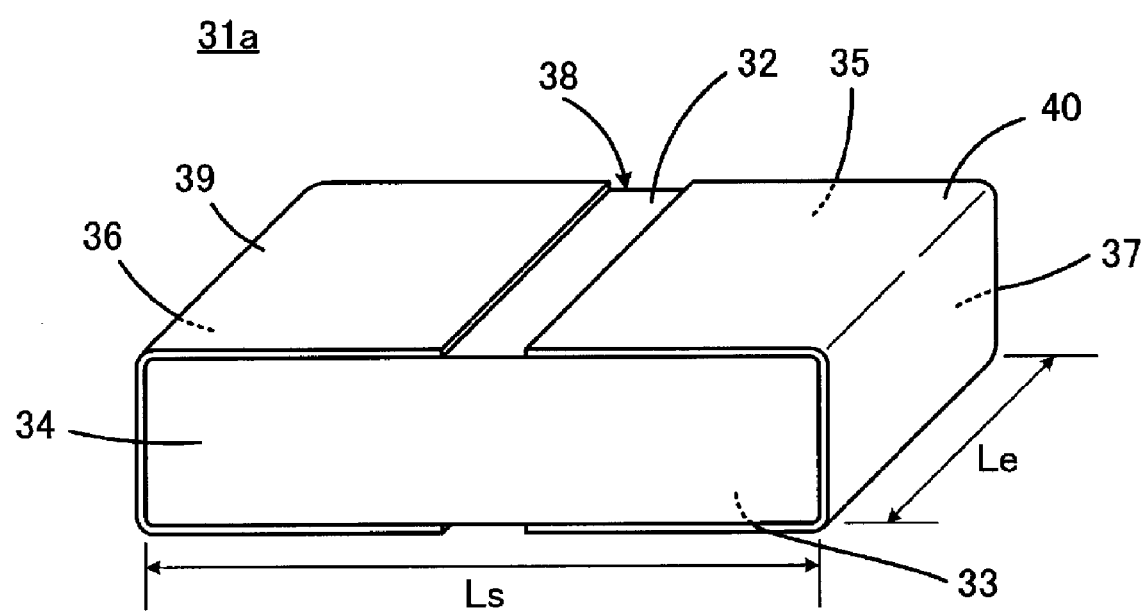
FIG. 18 is a drawing showing a twelfth preferred embodiment of the present invention and corresponding to FIG. 10.

FIGS. 14 to 18 show the eighth to twelfth preferred embodiments of the present invention. FIGS. 14, 16, and 17 correspond to FIG. 13. The elements of FIGS. 14, 16, and 17 corresponding to the elements of FIG. 13 are given same reference numerals and will not be repeatedly described. FIG. 15 corresponds to FIG. 12. The elements of FIG. 15 corresponding to the elements of FIG. 12 are given same reference numerals and will not be repeatedly described. FIG. 18 corresponds to FIG. 10. The elements of FIG. 18 corresponding to the elements of FIG. 10 are given same reference numerals and will not be repeatedly described.

A multilayer capacitor according to the eighth preferred embodiment shown in FIG. 14 is the same as the multilayer capacitor 31 according to the above-mentioned tenth preferred embodiment with respect to the appearance, the disposition state of the first and second capacitor units 42 and 43, and the configurations of the first and second internal electrodes 47 and 48 of the first capacitor unit 42.

In the eighth preferred embodiment, as shown in FIGS. 14A to 14D sequentially, two third internal electrodes 49 and two fourth internal electrodes 50 are alternately arranged in the lamination direction. The eighth preferred embodiment achieves the same advantages as that of the above-mentioned second preferred embodiment shown in FIG. 5.

Figure 14A:
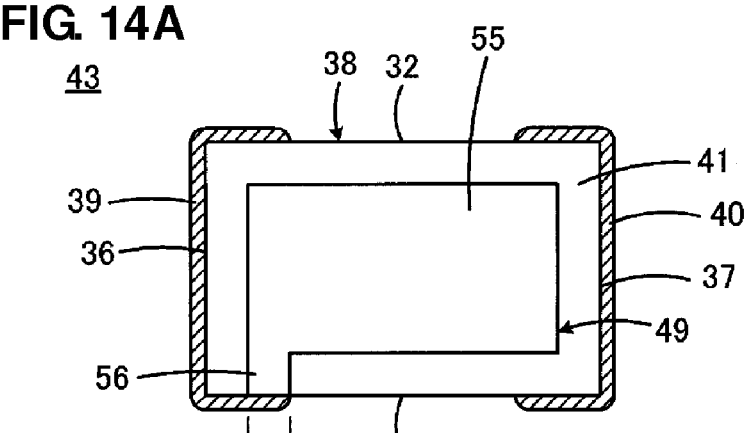
FIGS. 14A to 14D are drawings showing an eighth preferred embodiment of the present invention and corresponding to FIGS. 13A and 13B.
Figure 14B:
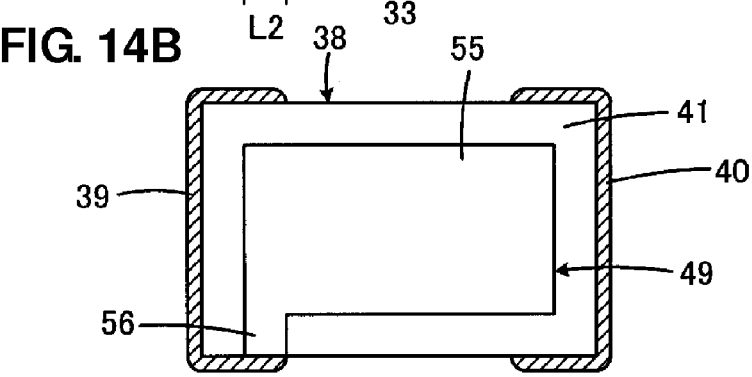
Figure 14C:
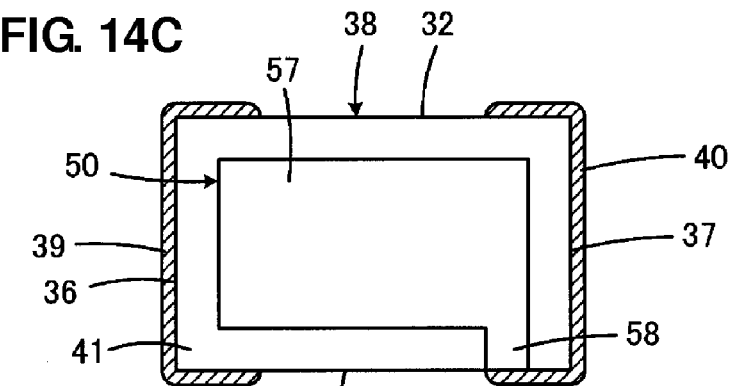
Figure 14D:
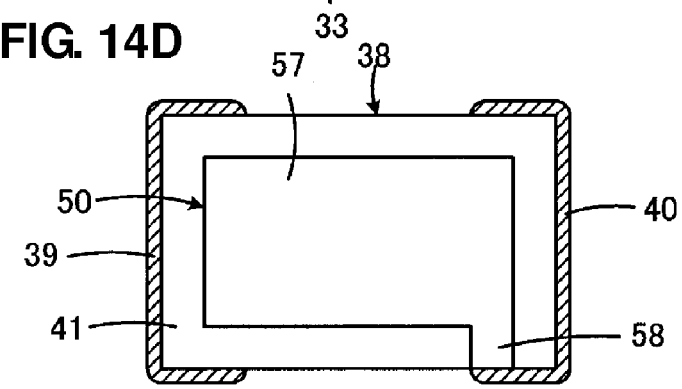

In the second capacitor unit 43 according to the eighth preferred embodiment, as shown in FIGS. 14C to 14D, the width direction dimension of the fourth extended portion 58 is smaller than that of the second extended portion 54 (see FIG. 12B). However, if the fourth internal electrode 50 has the same configuration as, for example, that of the second internal electrode 48 and the width direction dimension of the fourth extended portion 58 is equal to that of the second extended portion 54, only multiple third internal electrodes 49 may be disposed continuously in the lamination direction.

Figure 15A:
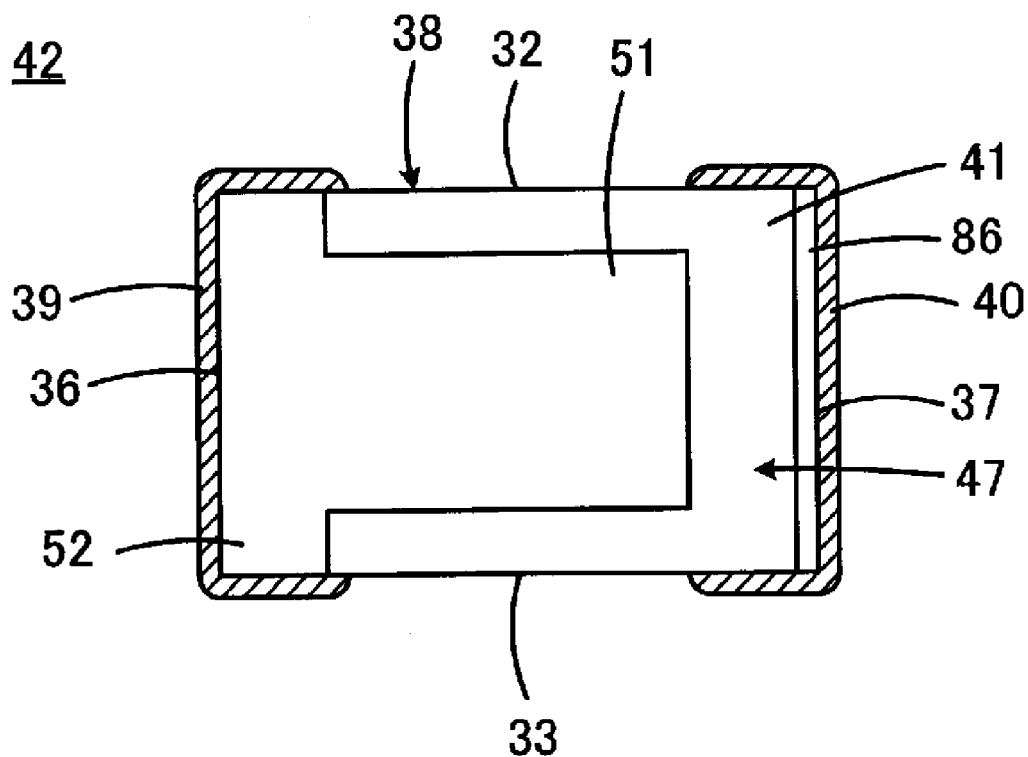
FIGS. 15A and 15B are drawings showing a ninth preferred embodiment of the present invention and corresponding to FIGS. 12A and 12B.
Figure 15B:
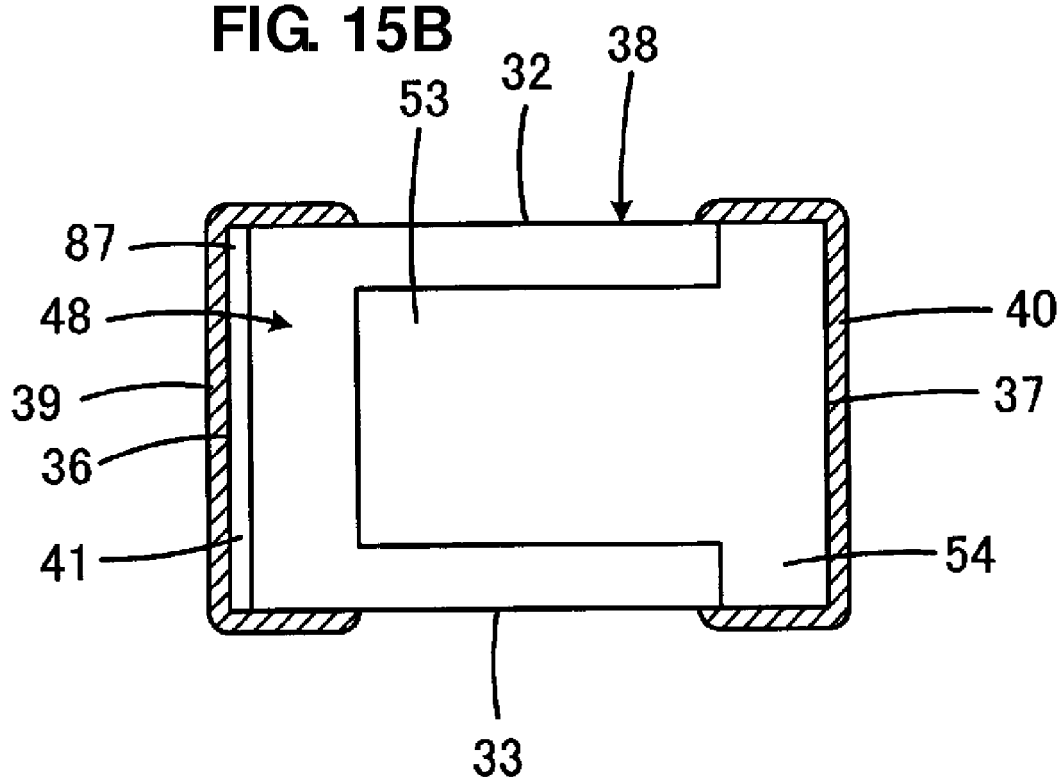

In the ninth preferred embodiment shown in FIG. 15, the first capacitor unit 42 includes dummy electrodes 86 and 87. More specifically, as shown in FIG. 15A, the dummy electrode 86 is arranged so that it is exposed to the second end surface 37 and respective portions of first and second main surfaces 32 and 33 so as to be flush with the first internal electrode 47. On the other hand, as shown in FIG. 15B, the dummy electrode 87 is arranged so that it is exposed to the first end surface 36 and respective portions of first and second main surfaces 32 and 33 so as to be flush with the second internal electrode 48.

As with the third preferred embodiment shown in FIG. 6, by forming the dummy electrodes 86 and 87 as in the ninth preferred embodiment, not only the internal electrodes 47 and 48 but also the dummy electrodes 86 and 87 are bonded to the external terminal electrodes 39 and 40. Therefore, the number of the bonded elements and portions is increased. As a result, the adhesion of the external terminal electrodes 39 and 40 to the capacitor body 38 is improved. Also, if the external terminal electrodes 39 to 40 are formed on surfaces of the capacitor body by direct plating, the number of portions serving as the cores for plate deposition is increased. Thus, the adhesion of the external terminal electrodes 39 and 40 to the capacitor body 38 is improved and the plating time is reduced.

Figure 16A:
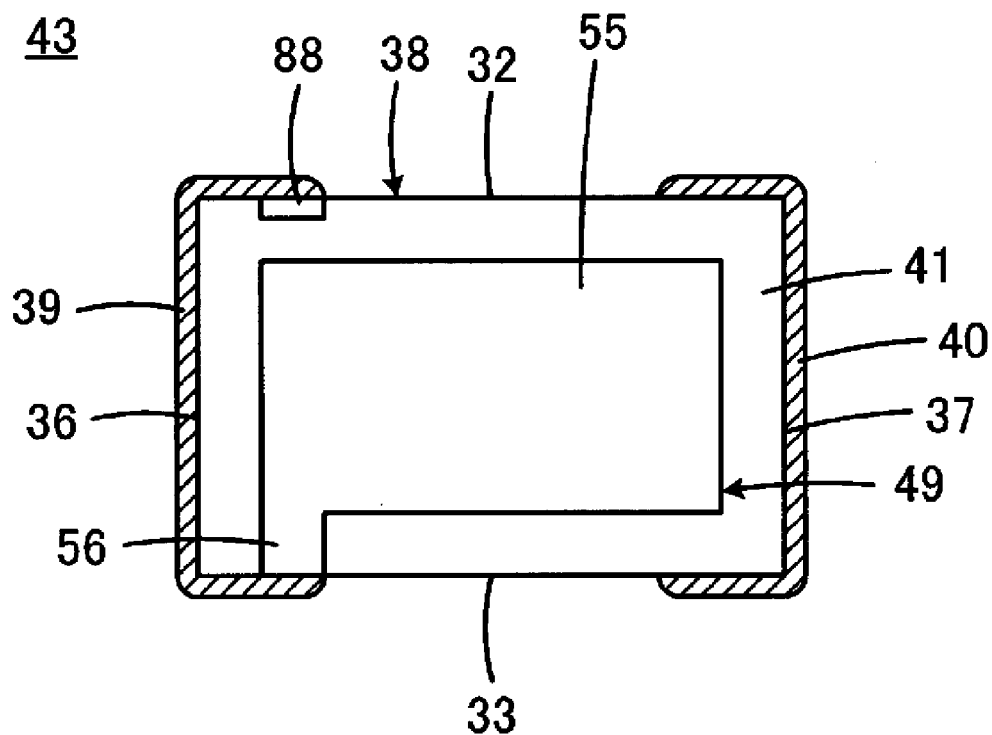
FIGS. 16A and 16B are drawings showing a tenth preferred embodiment of the present invention and corresponding to FIGS. 13A and 13B.
Figure 16B:
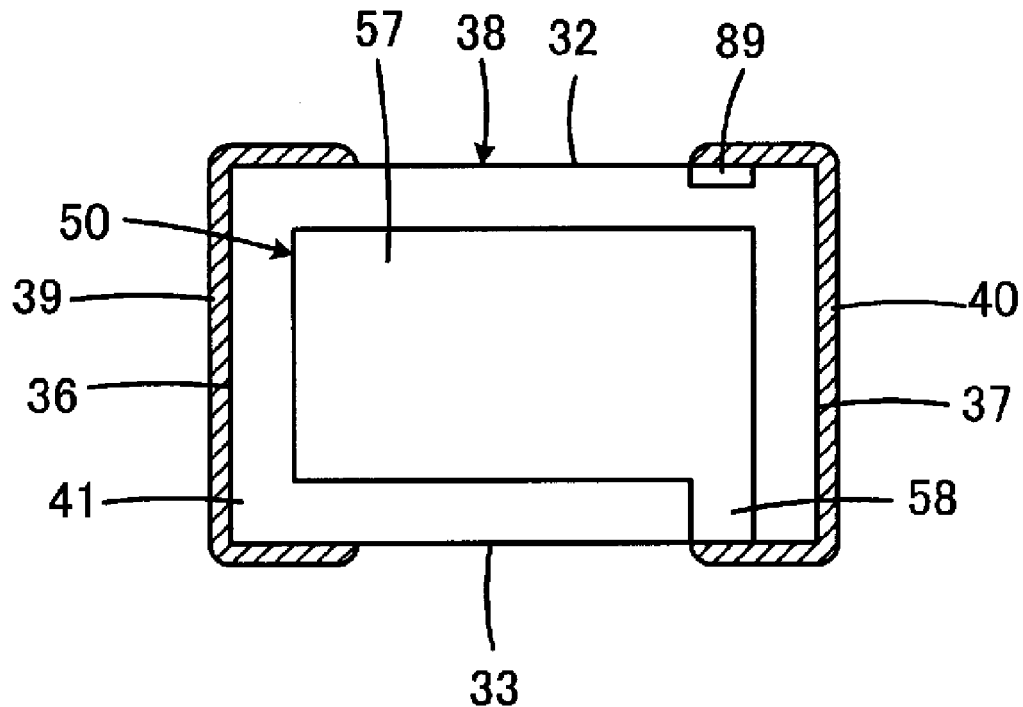

In the tenth preferred embodiment shown in FIG. 16, the second capacitor 43 includes dummy electrodes 88 and 89. More specifically, as shown in FIG. 16A, the dummy electrode 88 is arranged so that it is exposed to the first main surface 32 in a manner flush with the third internal electrode 49. On the other hand, as shown in FIG. 16B, the dummy electrode 89 is arranged so that it is exposed to the first main surface 32 in a manner flush with the fourth internal electrode 50. The width direction dimension of the dummy electrode 88 is preferably the same as that of the exposed edge of the third extended portion 56 of the flush third internal electrode 49. The width direction dimension of the dummy electrode 89 is preferably the same as that of the exposed edge of the fourth extended portion 58 of the flush fourth internal electrode 50.

The tenth preferred embodiment achieves the same advantages as that of the above-mentioned ninth preferred embodiment.

As shown in FIG. 17A, in the second capacitor unit 43 according to the eleventh preferred embodiment shown in FIG. 17, the third extended portion 56 of the third internal electrode 49 is extended to the first end surface 36 in such a manner that the third extended portion 56 is electrically coupled to the first external terminal electrode 39. On the other hand, as shown in FIG. 17B, the extended portion 58 of the fourth internal electrode 50 is extended to the second end surface 37 in such a manner that the fourth extended portion 58 is electrically coupled to the second external terminal electrode 40. By adopting the above-mentioned configuration, the length of the path from the mount surface 46 (see FIG. 11) to the second capacitor unit 43 is increased. As a result, the ESR of the second capacitor unit 43 is increased.

Unlike the multilayer capacitor 31 according to the seventh preferred embodiment shown in FIG. 10, a multilayer capacitor 31a according to the twelfth preferred embodiment shown in FIG. 18 is not of so-called "LW reverse type" and the length direction dimension Le of each of the first and second end surfaces 36 and 37 of the capacitor body 38 is smaller than the length direction dimension Ls of each of the first and second side surfaces 34 and 35. Also, the areas of the first and second main surfaces 32 and 33 over which the first and second external terminal electrodes 39 and 40 extend are relatively large. Also, the first and second external terminal electrodes 39 and 40 are prevented from being formed on the first and second side surfaces 34 and 35. The twelfth preferred embodiment is meaningful in clearly demonstrating that various modifications can be made to the shape of the capacitor body 38.

While preferred embodiments of the invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer capacitor comprising:
   a capacitor body including a plurality of laminated dielectric layers, first and second main surfaces opposed to each other, first and second side surfaces opposed to each other, and first and second end surfaces opposed to each other, a length direction dimension of each of the first and second end surfaces being larger than a length direction dimension of each of the first and second side surfaces; and
   first and second external terminal electrodes disposed on the first and second end surfaces, respectively, of the capacitor body; wherein
   the capacitor body includes first and second capacitor units disposed along a lamination direction of the dielectric layers;
   the first capacitor unit includes first and second internal electrodes opposed to each other with a predetermined dielectric layer of the dielectric layers interposed therebetween so as to generate a capacitance;
   the second capacitor unit includes third and fourth internal electrodes opposed to each other with a predetermined dielectric layer of the dielectric layers interposed therebetween so as to generate a capacitance;
   the first internal electrode includes a first opposed portion and a first extended portion that is extended from the first opposed portion to the first end surface and that is electrically coupled to the first external terminal electrode;
   the second internal electrode includes a second opposed portion opposed to the first opposed portion with the predetermined dielectric layer interposed therebetween and a second extended portion that is extended from the second opposed portion to the second end surface and that is electrically coupled to the second external terminal electrode;

the third internal electrode includes a third opposed portion and a third extended portion that is extended from the third opposed portion to the first end surface and that is electrically coupled to the first external terminal electrode;

the fourth internal electrode includes a fourth opposed portion opposed to the third opposed portion with the predetermined dielectric layer interposed therebetween and a fourth extended portion that is extended from the fourth opposed portion to the second end surface and that is electrically coupled to the second external terminal electrode;

a width direction dimension of the first extended portion is larger than a width direction dimension of the third extended portion;

an area of each of respective portions of the first and second opposed portions, the respective portions being opposed to each other, being smaller than an area of each of respective portions of the third and fourth opposed portions, the respective portions being opposed to each other;

the first, second, third, and fourth extended portions do not extend to either of the first side surface and the second side surface;

each of the first, second, third, and fourth opposed portions is defined by only a single opposed portion that does not include any slits provided therein; and wherein each dielectric layer has only one opposed portion formed thereon.

2. The multilayer capacitor according to claim 1, a width direction dimension of the second extended portion is larger than a width direction dimension of the fourth extended portion.

3. The multilayer capacitor according to claim 1, wherein the plurality of third internal electrodes are disposed continuously in a lamination direction in the second capacitor unit.

4. The multilayer capacitor according to claim 1, wherein the plurality of fourth internal electrodes are disposed continuously in a lamination direction in the second capacitor unit.

5. The multilayer capacitor according to claim 1, wherein the multilayer capacitor is mounted in such a manner that the first capacitor unit is closer to a mount surface than the second capacitor unit.

6. A multilayer capacitor comprising:
a capacitor body including a plurality of laminated dielectric layers, first and second main surfaces opposed to each other, first and second side surfaces extending a surface direction of the dielectric layers and opposed to each other, and first and second end surfaces opposed to each other; and first and second external terminal electrodes disposed on at least the second main surface in a state where the first and second external terminal electrodes are insulated from each other; wherein the multilayer capacitor is mounted in such a manner that the second main surface faces a mount surface;

the capacitor body includes first and second capacitor units disposed along a lamination direction of the dielectric layers;

the first capacitor unit includes first and second internal electrodes opposed to each other with a predetermined dielectric layer of the dielectric layers interposed therebetween so as to generate a capacitance;

the second capacitor unit includes third and fourth internal electrodes opposed to each other with a predetermined dielectric layer of the dielectric layers interposed therebetween so as to generate a capacitance;

the first internal electrode includes a first opposed portion and a first extended portion that is extended from the first opposed portion to the second main surface and that is electrically coupled to the first external terminal electrode;

the second internal electrode includes a second opposed portion opposed to the first opposed portion with the predetermined dielectric layer interposed therebetween and a second extended portion that is extended from the second opposed portion to the second main surface and that is electrically coupled to the second external terminal electrode;

the third internal electrode includes a third opposed portion and a third extended portion that is extended from the third opposed portion and that is electrically coupled to the first external terminal electrode;

the fourth internal electrode includes a fourth opposed portion opposed to the third opposed portion with the predetermined dielectric layer interposed therebetween and a fourth extended portion that is extended from the fourth opposed portion and that is electrically coupled to the second external terminal electrode;

a width direction dimension of the first extended portion is larger than a width direction dimension of the third extended portion;

an area of each of respective portions of the first and second opposed portions, the respective portions being opposed to each other, being smaller than an area of each of respective portions of the third and fourth opposed portions, the respective portions being opposed to each other;

the third and fourth extended portions extend to and are exposed at the second main surface;

a first dummy electrode is exposed at the first main surface and is substantially coplanar with the third internal electrode;

a width direction dimension of the first dummy electrode is substantially the same as a width direction dimension of an exposed edge of the third extended portion;

a second dummy electrode is exposed at the first main surface and is substantially coplanar with the fourth internal electrode;

a width direction dimension of the second dummy electrode is substantially the same as a width direction dimension of an exposed edge of the fourth internal electrode;

the first and second dummy electrodes are arranged so as not to generate a capacitance; and the first dummy electrode and the third extended portion are opposed to one another along a line extending from the first main surface to the second main surface.

7. The multilayer capacitor according to claim 6, a width direction dimension of the second extended portion is larger than a width direction dimension of the fourth extended portion.

8. The multilayer capacitor according to claim 6, wherein the plurality of third internal electrodes are disposed continuously in a lamination direction in the second capacitor unit.

9. The multilayer capacitor according to claim 6, wherein the plurality of fourth internal electrodes are disposed continuously in a lamination direction in the second capacitor unit.

* * * * *